United States Patent
Dutta Choudhury et al.

(10) Patent No.: US 12,106,776 B2
(45) Date of Patent: Oct. 1, 2024

(54) COORDINATION OF SLOW MOTION VIDEO WITH AUDIO

(71) Applicant: QUALCOMM Incorporated, San Diego, CA (US)

(72) Inventors: Shubhobrata Dutta Choudhury, New Delhi (IN); Aditya Mishra, Chhatarpur (IN); Sai Krishna Bodapati, Vijaywada (IN); Sudheer Reddy Kesani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/932,361

(22) Filed: Sep. 15, 2022

(65) Prior Publication Data

US 2024/0096373 A1    Mar. 21, 2024

(51) Int. Cl.
  *G11B 27/00*    (2006.01)
  *H04N 21/472*   (2011.01)

(52) U.S. Cl.
  CPC ..... *G11B 27/005* (2013.01); *H04N 21/47217* (2013.01)

(58) Field of Classification Search
  CPC .............. G11B 27/005; H04N 21/47217
  See application file for complete search history.

(56) References Cited

U.S. PATENT DOCUMENTS

| | | | |
|---|---|---|---|
| 11,153,442 B1* | 10/2021 | Balyasny | H04L 65/1089 |
| 11,632,530 B2* | 4/2023 | Ross | G06F 3/012 |
| | | | 386/230 |
| 2006/0204214 A1* | 9/2006 | Shah | G11B 27/036 |
| | | | 386/285 |
| 2015/0332732 A1* | 11/2015 | Gilson | G11B 27/005 |
| | | | 386/240 |
| 2015/0380054 A1 | 12/2015 | Vilermo et al. | |
| 2018/0012618 A1 | 1/2018 | Narita | |
| 2019/0332352 A1* | 10/2019 | Anantharaman | G06F 3/167 |

FOREIGN PATENT DOCUMENTS

| | | |
|---|---|---|
| EP | 4016986 A1 | 6/2022 |
| JP | 2008079073 A | 4/2008 |

OTHER PUBLICATIONS

International Search Report and Written Opinion—PCT/US2023/073014—ISA/EPO—Nov. 24, 2023.

* cited by examiner

*Primary Examiner* — Thai Q Tran
*Assistant Examiner* — Jose M Mesa
(74) *Attorney, Agent, or Firm* — QUALCOMM Incorporated; Espartaco Diaz Hidalgo

(57) ABSTRACT

A device includes a memory configured to store data corresponding to a media stream including video recorded at a first frame rate and multiple audio segments includes the multiple audio segments include one or more first audio segments indicated as having a first playback type and one or more second audio segments indicated as having a second playback type includes the device also includes one or more processors coupled to the memory and operably configured to initiate playback of the media stream includes the playback of the media stream includes playback of the video at a second frame rate that is different from the first frame rate, playback of the one or more first audio segments at a first playback speed corresponding to the first frame rate, and playback of the one or more second audio segments at a second playback speed corresponding to the second frame rate.

30 Claims, 13 Drawing Sheets

COORDINATION OF SLOW MOTION VIDEO WITH AUDIO

I. FIELD

The present disclosure is generally related to generating coordinating slow motion video with audio.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Slow motion recording is a widely used feature in such devices, but most slow motion recordings are hampered with either no audio or with misaligned, poor audio synchronization. To illustrate, conventional techniques treat audio as a single stream of data with an associated playback speed. By changing the playback speed of a regular video and audio file, slow motion audio behavior can be simulated.

However, a slow motion video is not simply a regular video that is played back slowly. Instead, slow motion videos are recorded at high frame rates and played back at lower frame rates, resulting in a slow motion effect. Attempting to generate slow motion audio by decreasing the playback speed of the audio stream (as recorded with the high frame rate video recording) results in misalignment and poor synchronization of the audio with the video during the playback. This can lead to poor user experience and bad video quality, and is one reason why most conventional portable computing devices such as smart phones do not record audio in slow motion recording modes.

Another reason that many conventional portable computing devices do not enable playback of audio in slow motion video is the poor audio perception that accompanies slow motion audio playback. To illustrate, spoken words that are captured in an audio recording during a high frame rate video recording can be converted to a slow-paced mumble that a viewer cannot make sense of or that is unintelligible when played back in slow motion.

Resolving the above issues—synchronization between reduced-speed audio and slow motion video during playback, improving the intelligibility of audio when played back in slow motion, or both—would enable improved audio playback with slow motion video playback and enhance a user experience.

III. SUMMARY

According to one implementation of the present disclosure, a device includes a memory configured to store data corresponding to a media stream including video recorded at a first frame rate and multiple audio segments. The multiple audio segments include one or more first audio segments indicated as having a first playback type and one or more second audio segments indicated as having a second playback type. The device also includes one or more processors coupled to the memory and operably configured to initiate playback of the media stream. The playback of the media stream includes playback of the video at a second frame rate that is different from the first frame rate, playback of the one or more first audio segments at a first playback speed corresponding to the first frame rate, and playback of the one or more second audio segments at a second playback speed corresponding to the second frame rate.

According to another implementation of the present disclosure, a method includes obtaining, at one or more processors, data corresponding to a media stream including video recorded at a first frame rate and multiple audio segments. The multiple audio segments include one or more first audio segments indicated as having a first playback type and one or more second audio segments indicated as having a second playback type. The method also includes initiating, at the one or more processors, playback of the media stream. The playback of the media stream includes playing the video at a second frame rate that is different from the first frame rate, playing one or more first audio segments at a first playback speed corresponding to the first frame rate, and playing one or more second audio segments at a second playback speed corresponding to the second frame rate.

According to another implementation of the present disclosure, a non-transitory computer-readable medium includes instructions that, when executed by one or more processors, cause the one or more processors to obtain data corresponding to a media stream including video recorded at a first frame rate and multiple audio segments. The multiple audio segments include one or more first audio segments indicated as having a first playback type and one or more second audio segments indicated as having a second playback type. The instructions, when executed by the one or more processors, also cause the one or more processors to initiate playback of the media stream. The playback of the media stream includes playback of the video at a second frame rate that is different from the first frame rate, playback of the one or more first audio segments at a first playback speed corresponding to the first frame rate, and playback of the one or more second audio segments at a second playback speed corresponding to the second frame rate.

According to another implementation of the present disclosure, an apparatus includes means for storing data corresponding to a media stream including video recorded at a first frame rate and multiple audio segments. The multiple audio segments include one or more first audio segments indicated as having a first playback type and one or more second audio segments indicated as having a second playback type. The apparatus also includes means for initiating playback of the media stream, the playback of the media stream including playback of the video at a second frame rate that is different from the first frame rate, playback of one or more first audio segments at a first playback speed corresponding to the first frame rate, and playback one or more second audio segments at a second playback speed corresponding to the second frame rate.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
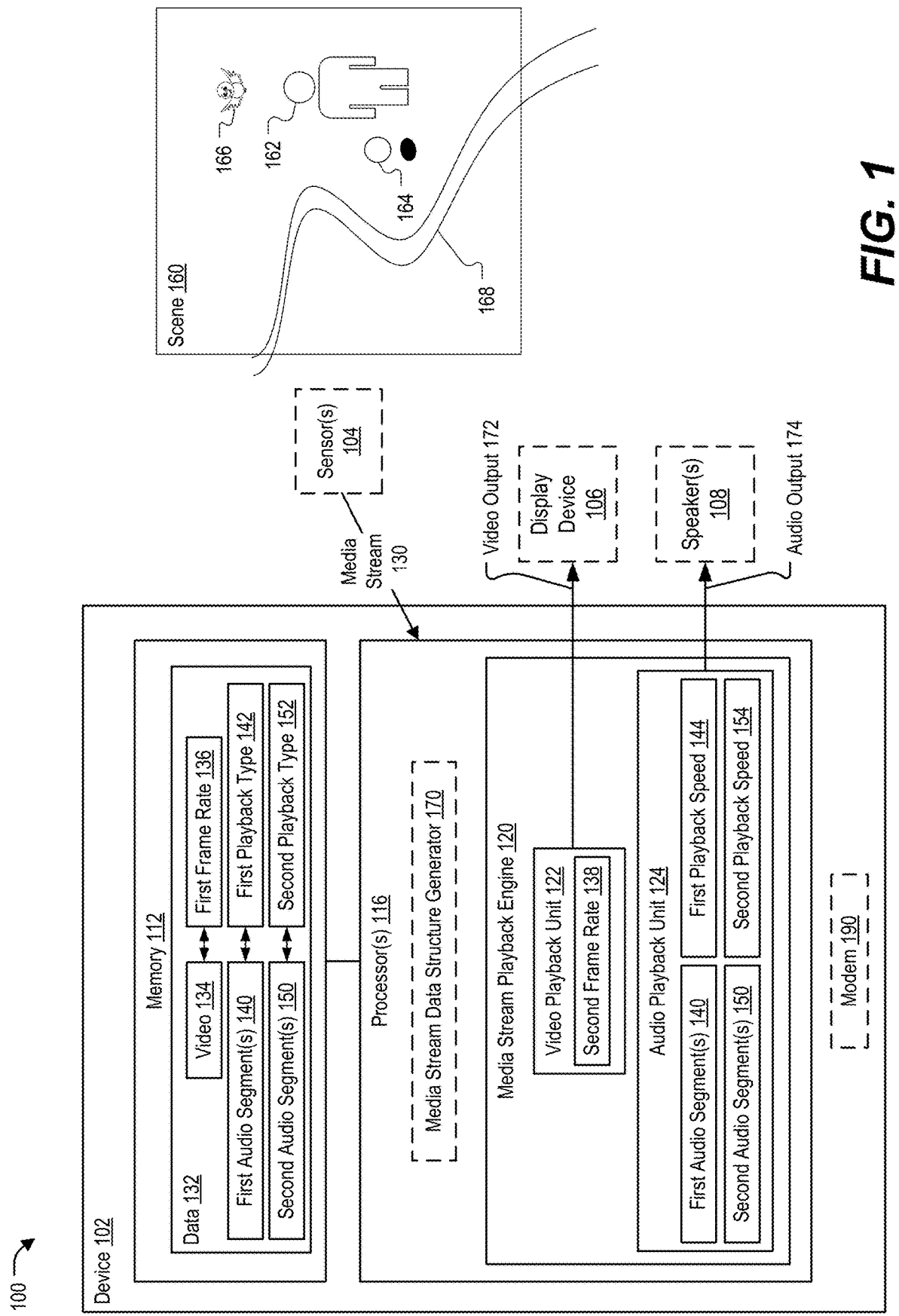
FIG. 1 is a block diagram of a particular illustrative aspect of a system configured to coordinate slow motion video with audio, in accordance with some examples of the present disclosure.

Slow motion recording is a widely used feature of many electronic devices such as smart phones. However, most slow motion recordings are hampered with either no audio or with misaligned, poor audio synchronization. For example, decreasing the playback speed of an audio stream recorded with high frame rate video often results in misalignment or poor synchronization of the audio with the video during the playback. In addition, reducing the playback speed of audio for slow motion video can cause the audio to be distorted to a degree that a viewer cannot make sense of the audio, such as when speech is slowed down to an unintelligible mumble.

Systems and techniques are described herein that provide solutions for coordinating slow motion video with audio. For instance, the systems and techniques may process audio recorded with high-frame rate (HFR) video to distinguish between portions of the audio that are perceivable and portions of the audio that are non-perceivable. As used herein, audio that a viewer can make sense of when played back in slow motion is referred to as "perceivable," and audio that a viewer cannot make sense of when played back in slow motion is referred to as "non-perceivable." In this context, the terms "perceivable" and "non-perceivable" indicate whether audio is predicted to make sense to a viewer when played at reduced speed and accompanying playback of slow motion video, and do not indicate whether the audio is hearable by the viewer (e.g., of sufficient volume and appropriate frequency range for human hearing); in particular, audio can be simultaneously hearable and "non-perceivable."

Although speech may be non-perceivable, other sounds may be perceivable when played back in slow motion, such as sounds that are associated with motions or events in the slow motion video, such as the sound of a ball bouncing or a door closing in the video. The perceivable portions such audio can be played back at reduced speed corresponding to the slow motion video playback, while the non-perceivable portions can be played back at regular speed as individual audio segments that are temporally aligned with a respective video frame for each of the non-perceivable sounds. Playing back non-perceivable audio (e.g., speech) at regular speed during the slow motion video playback prevents the loss of intelligibility that would occur if the non-perceivable audio were played back at the reduced speed.

According to some aspects, a neural network, such as recurrent neural network (RNN), is configured (e.g., trained) to filter (e.g., distinguish between) perceivable and non-perceivable audio sub-streams from an audio stream that was recorded while recording the HFR video. The neural network can be configured as a single-in-multi-out network where the input is a recorded audio stream, and the outputs are the perceivable audio sub-stream and the non-perceivable audio sub-stream. According to some aspects, an "ignore" parameter can be used (e.g., trained with a neural network, input from a user, etc.) to ignore audio if the audio is not relevant to the associated scene in the HFR video.

The disclosed systems and techniques therefore provide solutions to provide audio to accompany slow motion videos in a manner that enhances the user experience. Such solutions reduce or eliminate the synchronization drift and sound perception issues that are commonly associated with conventional techniques. Thus, the disclosed systems and techniques can be used to generate slow motion videos with high-quality audio (low synchronization drift) and suitable to the users (high perception). Other benefits and examples of applications in which the disclosed techniques can be used are described in further detail below and with reference to the accompanying figures.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 116 of FIG. 1), which indicates that in some implementations the device 102 includes a single processor 116 and in other implementations the device 102 includes multiple processors 116.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to coordinate slow motion video with audio is disclosed. The system 100 includes a device 102 that includes a memory 112 and one or more processors 116. In some implementations, the device 102 corresponds to a computing device such as a mobile phone, laptop computer, server, etc., a headset or other head mounted device, or a vehicle, as illustrative, non-limiting examples.

The memory 112 is configured to store data 132 corresponding to a media stream 130. In a particular example, the media stream 130 corresponds to HFR video and audio of a scene 160. The scene 160 includes multiple audio sources corresponding to visible objects, including a talking person 162, a bouncing ball 164, a chirping bird 166, and a babbling brook 168. In some implementations, the media stream 130 is received from one or more sensors 104 that are optionally included in or coupled to the device 102. In other implementations, the media stream 130 is received from another device, such as via wireless transmission from a remote device, as described further below.

The data 132 includes video 134 recorded at a first frame rate 136, such as a frame rate associated with recording HFR video (e.g., 120 frames per second (FPS)) as an illustrative, non-limiting example. The data 132 also includes multiple audio segments including one or more first audio segments 140 and one or more second audio segments 150. The one or more first audio segments 140 are indicated as having a first playback type 142 and the one or more second audio segments 150 are indicated as having a second playback type 152. As explained further below, the first playback type 142 is associated with non-perceivable sounds that are to be played back at regular speed, and the second playback type 152 is associated with perceivable sounds that can be played back at an adjusted (e.g., reduced) speed.

The one or more processors 116 are coupled to the memory 112 and include a media stream playback engine 120 and, optionally. a media stream data structure generator 170. According to some implementations, one or more of the components of the one or more processors 116 can be implemented using dedicated circuitry. As non-limiting examples, one or more of the components of the one or more processors 116 can be implemented using a field programmable gate array (FPGA), an application-specific integrated circuit (ASIC), etc. According to another implementation, one or more of the components of the one or more processors 116 can be implemented by executing instructions stored in the memory 112. For example, the memory 112 can be a non-transitory computer-readable medium that stores instructions executable by the one or more processors 116 to perform the operations described herein.

The media stream playback engine 120 includes a video playback unit 122 and an audio playback unit 124. The video playback unit 122 is configured to perform video playback to generate a video output 172. For example, the video playback unit 122 performs slow motion playback of the video 134 at a second frame rate 138 that is different from the first frame rate 136 to generate the video output 172. To illustrate, the video 134 can correspond to HFR video that is recorded at 120 FPS (the first frame rate 136) and played back at 30 FPS (the second frame rate 138) as slow motion video.

The audio playback unit 124 is configured to perform audio playback of audio segments to generate an audio output 174. During audio playback, audio segments having the first playback type 142 are played out at a first playback speed 144 (e.g., non-perceivable audio is played out at the original speed of audio recording), and audio segments having the second playback type 152 are played at a second playback speed 154 (e.g., perceivable audio is played out at a reduced speed). According to some aspects, particular audio segments are associated with particular video frames, and the audio playback unit 124 is configured to control the playout times of audio segments to synchronize the audio output 174 with the video output 172, as described further with reference to FIG. 2.

The one or more processors 116 are operably configured to initiate playback of the media stream 130, such as in response to a user command received via a touchscreen or a speech interface, as illustrative, non-limiting examples. According to some aspects, initiating playback of the media stream 130 includes sending one or more control signals to cause the video playback unit 122 to perform playback of the video 134 and sending one or more control signals to cause the audio playback unit 124 to perform playback of the one or more first audio segments 140 and playback of the one or more second audio segments 150. During playback of the media stream 130, the video playback unit 122 plays out the video 134 at the second frame rate 138, resulting in the video output 172 representing slow motion video of the scene 160.

Playback of the media stream 130 also includes playback of the one or more first audio segments 140 at the first playback speed 144 corresponding to the first frame rate 136 (e.g., the audio speed at the time of recording). For example, the audio playback unit 124 processes the one or more first audio segments 140 to generate a first sub-stream of non-perceivable sounds (e.g., the speech of the person 162, the chirping of the bird 166) that are each played out at the first playback speed 144 (e.g., at regular speed) and that are timed to synchronize with the event in the video output 172 that corresponds to the respective origin of each of the non-perceivable sounds.

In a particular example, the start of the talking of the person 162 in the audio output 174 is synchronized with the slow motion video playback so that the audible speech of the person 162 begins substantially simultaneously with displaying the video frame in the slow motion video output 172 where the person 162 begins speaking. Because the person's speech is played out at regular speed while the video of the person 162 speaking is played out in slow motion, the speech will remain intelligible when played out, although the movement of the person's mouth producing the speech in the slow motion video may appear to lose synchronization, over time, with the audible speech due to the difference in the playback speeds of the speech and the video.

Playback of the media stream 130 also includes playback of the one or more second audio segments 150 at the second playback speed 154 corresponding to the second frame rate 138 (e.g., a slower audio speed than at the time of recording). For example, the audio playback unit 124 processes the one or more second audio segments 150 to generate a second sub-stream of perceivable sounds (e.g., the bouncing of the ball 164, the sound of the brook 168) that are played out at the second playback speed 154 (e.g., at the slower speed). As described further with reference to FIG. 2, the one or more second audio segments 150 may be linked to regularly spaced "anchor" video frames so that any synchronization drift that may accumulate between the second sub-stream of perceivable sounds and the video playout is corrected when the next anchor video frame is played out.

Figure 3:
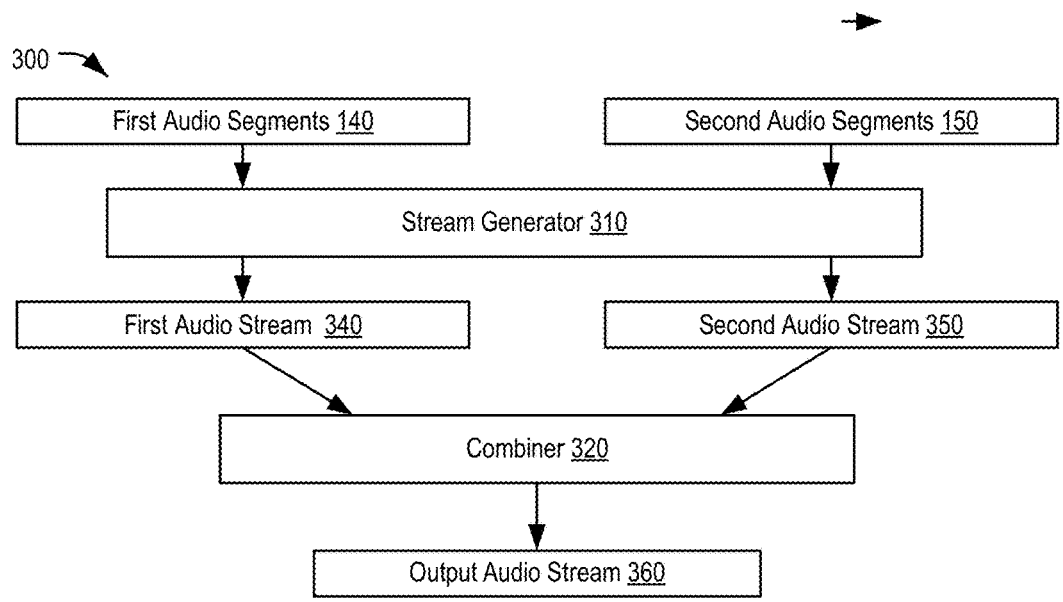
FIG. 3 is a block diagram of a particular illustrative aspect of components and operations that can be included in a system configured to coordinate slow motion video with audio, in accordance with some examples of the present disclosure.

The resulting first sub-stream of non-perceivable sounds of the one or more first audio segments 140 and the second sub-stream of perceivable sounds of the one or more second audio segments 150 are combined to generate the audio output 174, such as described further with reference to FIG. 3.

In some implementations, the device 102 includes, or is coupled to, an optional display device 106 that is configured to display the video output 172 to a viewer (e.g., a user of the device 102). In some implementations, the device 102 includes, or is coupled to, an optional one or more speakers 108 that are configured to play the audio output 174 to the viewer. In some implementations, the display device 106 and the one or more speakers 108 are included in a second device, such as a television or a mixed reality headset device, and the video output 172 and the audio output 174 are transmitted to the second device for playback.

Although the examples described above are for playback of audio that accompanies slow motion playback of HFR video, so that the second frame rate 138 is slower than the first frame rate 136, and the second playback speed 154 is slower than the first playback speed 144, in other implementations the media stream playback engine 120 can be used for other applications of media playback. As an illustrative example, the video 134 may be played back at an increased speed, the one or more first audio segments 140 can correspond to audio that is non-perceivable when played at the increased speed, and the one or more second audio segments 150 can correspond to audio that is perceivable at the increased speed. In this illustrative example, the second frame rate 138 is faster than the first frame rate 136, and the second playback speed 154 is faster than the first playback speed 144.

Figure 4:
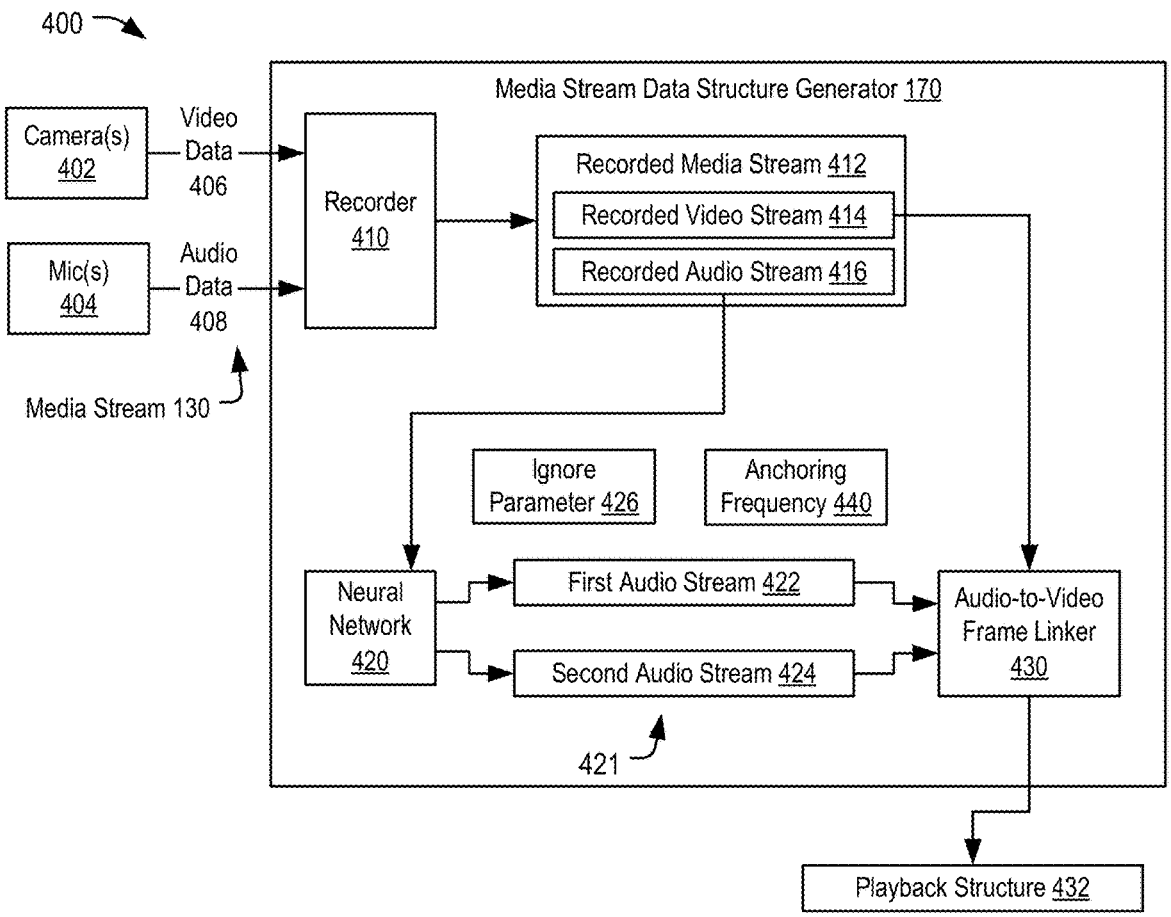
FIG. 4 is a block diagram of another illustrative aspect of components that can be included in system configured to coordinate slow motion video with audio, in accordance with some examples of the present disclosure.
Figure 5:
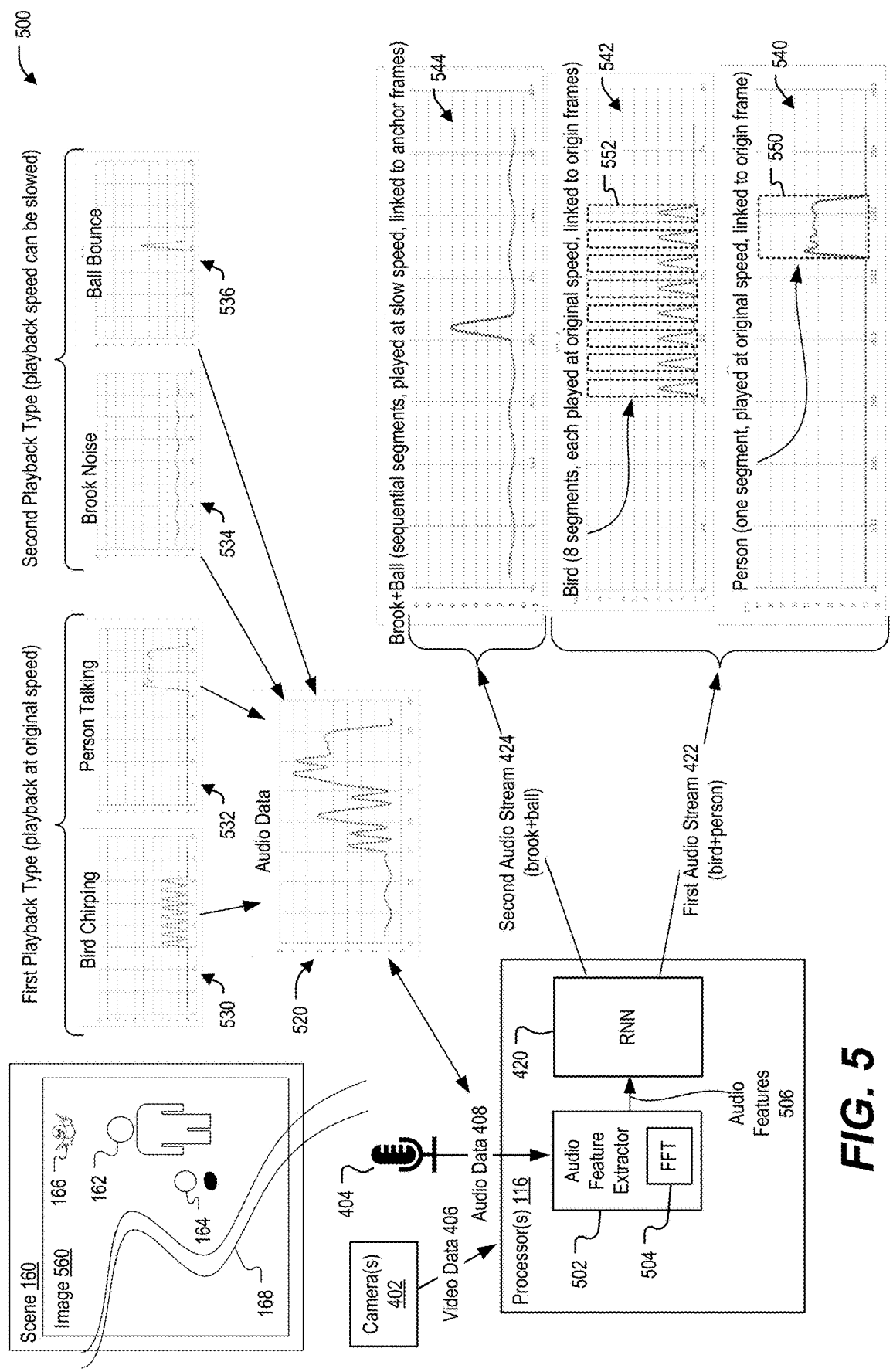
FIG. 5 is a diagram of another illustrative aspect of components and operations that can be included in a system configured to coordinate slow motion video with audio, in accordance with some examples of the present disclosure.
Figure 6:
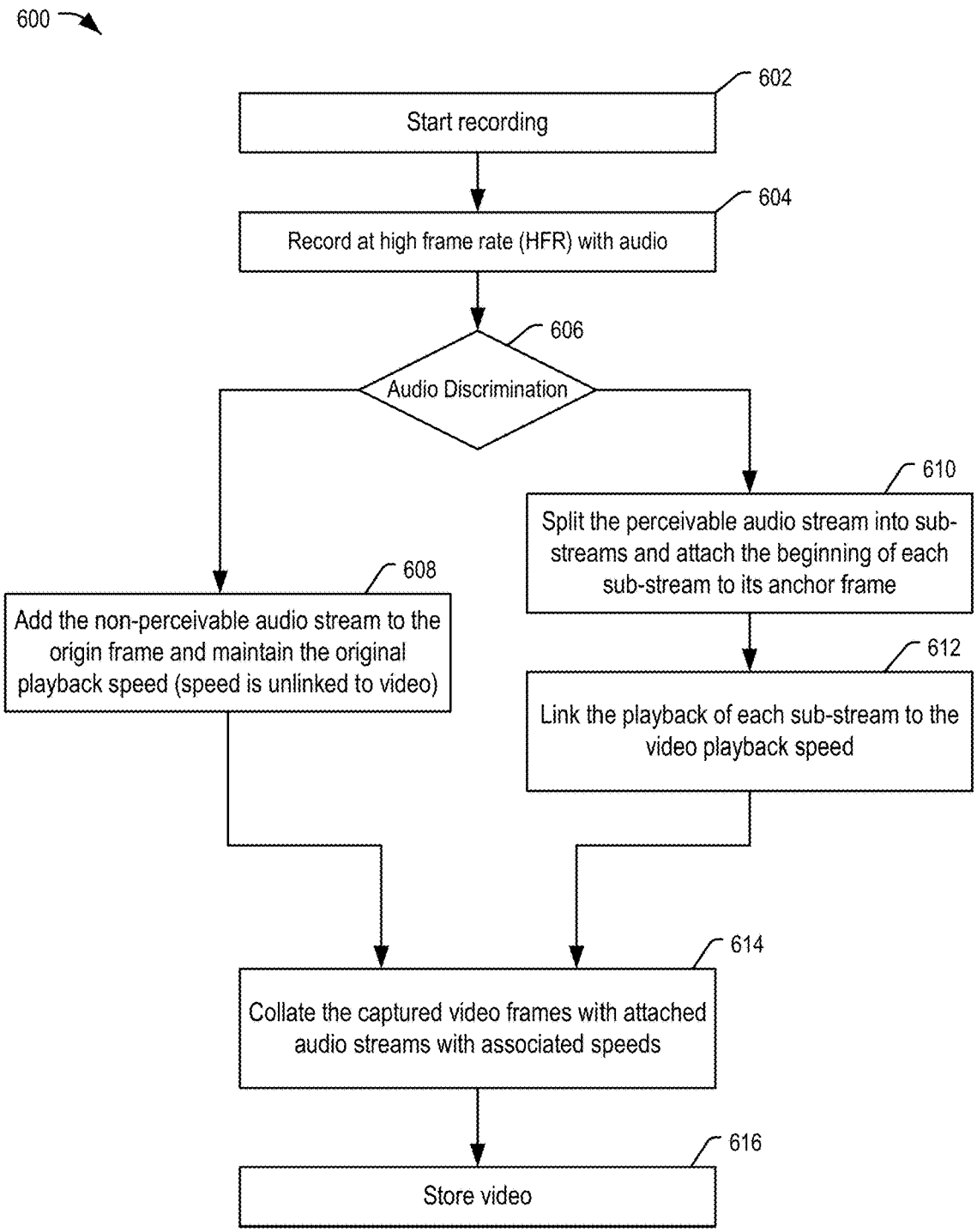
FIG. 6 is a diagram of a particular implementation of a method of coordinating slow motion video with audio, in accordance with some examples of the present disclosure.

The optional media stream data structure generator 170 is configured to process the media stream 130 to generate the data 132 including the one or more first audio segments 140 indicated as the first playback type 142 and the one or more second audio segments 150 indicated as the second playback type 152, as described further with reference to FIGS. 4-6. The media stream data structure generator 170 thus enables the device 102 to process its own recordings (e.g., the media stream 130 from the one or more sensors 104) to coordinate slow motion video with audio for playback. Alternatively, or in addition, the device 102 may receive the data 132 from another device, such as via the modem 190.

As indicated above, the device 102 optionally includes the modem 190 coupled to the one or more processors 116. The modem 190 is configured to enable wireless communication with another device, such as to receive the media stream 130 from a second device or to send the video output 172, the audio output 174, or both, to the second device. In some examples, the device 102 can communicate with another device using a low-energy protocol (e.g., a Bluetooth® low energy (BLE) protocol). In some examples, the wireless connection corresponds to transmission and receipt of signals in accordance with an IEEE 802.11-type (e.g., WiFi) wireless local area network or one or more other wireless radiofrequency (RF) communication protocols.

Functionality described for the device 102 can be implemented in a variety of different types of devices, examples of which are illustrated in FIG. 7-16. To illustrate, in some examples the one or more processors 116 are integrated in at least one of a mobile phone, a tablet computer device, a wearable electronic device, or a camera device, such as described with reference to FIGS. 8, 10, and 12. In some examples, the one or more processors 116 are integrated in a virtual reality headset, a mixed reality headset, or an augmented reality headset, such as described with reference to FIG. 13. In some examples, the one or more processors 116 are integrated in a vehicle, such as described with reference to FIG. 15 and FIG. 16.

By playing out audio of the one or more first audio segments 140 having the first playback type 142 using the first playback speed 144, sound perception issues that can arise from adjusting the playback speed of the audio are avoided. Synchronization drift associated with playing out audio using the second playback speed 154 (e.g., slower than the original speed) can be reduced or eliminated by playing the one or more second audio segments 150 as a sequence of segments that are associated with a sequence of anchor frames in the video 134. Thus, the disclosed systems and techniques can be used to provide adjusted-speed playback of videos with enhanced sound quality.

Figure 2:
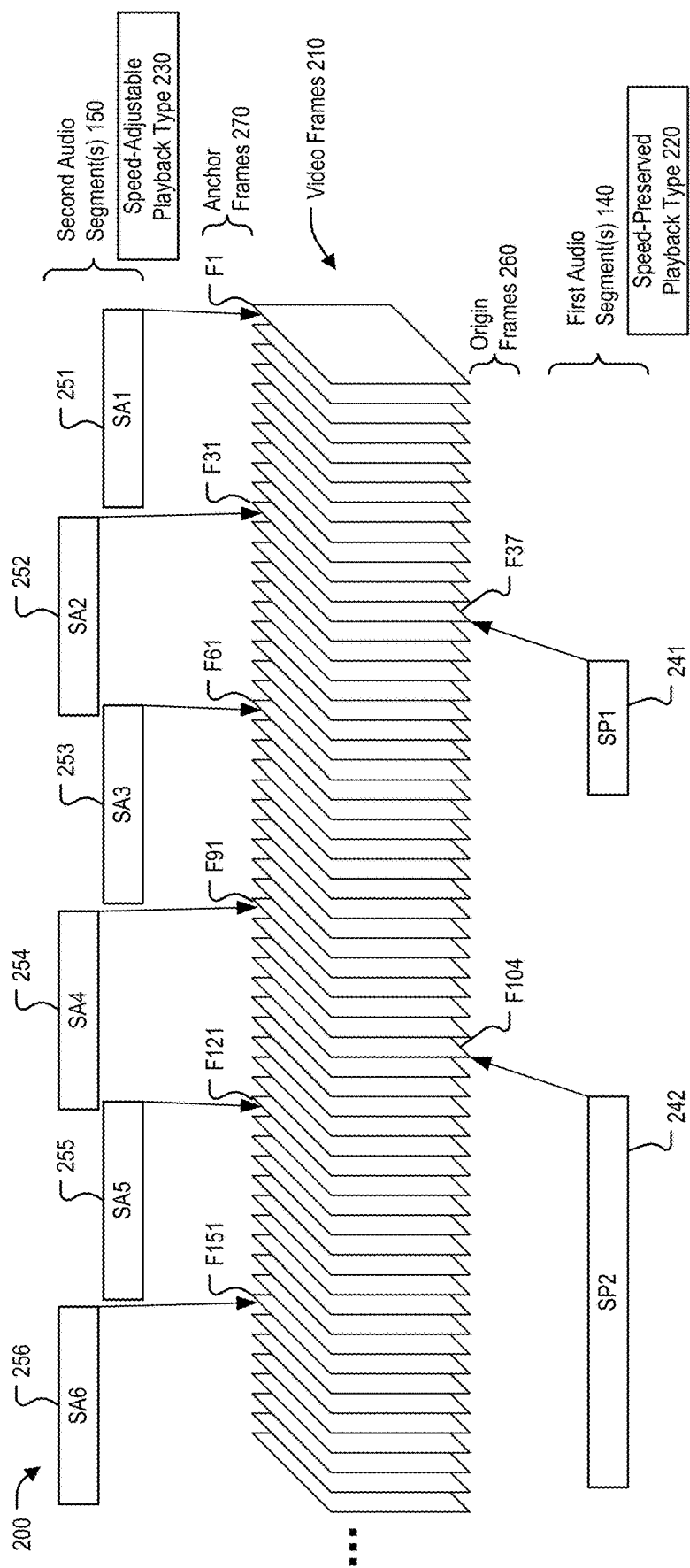
FIG. 2 is a graphical representation of audio segments associated with video frames for playback of coordinated slow motion video with audio, in accordance with some examples of the present disclosure.

FIG. 2 depicts a graphical representation 200 of multiple audio segments associated with video frames that may be used by the device 102, according to some implementations. The multiple audio segments include the one or more first audio segments 140 and the one or more second audio segments 150 that are associated with the video frames 210. Each of the multiple audio segments is associated with a respective particular frame of the video that represents a playback begin point for that audio segment, as explained further below.

The video frames 210 correspond to the video 134 and are illustrated arranged in a playback sequence, beginning with an initial video frame (F1) that is played first in the playback sequence. According to some aspects, the horizontal axis of FIG. 2 represents a time axis, with playback of the initial video frame (F1) occurring at a first time (e.g., t1) and playback of each successive video frame occurring at regular time intervals following F1 (e.g., frame 2 is played out after frame 1, frame 3 is played out after frame 2, etc.). It should be understood that, for purposes of illustration, fewer video frames are depicted than are indicated by the indices of the video frames. For example, nine video frames are illustrated between F1 and frame 31 (F31), nine video frames are illustrated between F31 and frame 61 (F61), etc. The particular depiction of the video frames 210 should therefore be considered as illustrative rather than limiting.

The one or more first audio segments 140 are indicated as having a speed-preserved (SP) playback type 220 that corresponds to the first playback type 142. The speed-preserved playback type 220 indicates that the playback speed of the audio of the one or more first audio segments 140 is to be preserved, and not adjusted to match the speed of video playback.

The one or more first audio segments 140 include a first speed-preserved segment (SP1) 241 and a second speed-preserved segment (SP2) 242. Each of the one or more first audio segments 140 is associated with a respective origin frame 260 of the video frames 210 that corresponds to an associated audio-generating event in the video 134.

As a first example, SP1 corresponds to a chirp of the bird 166 that begins at frame 37 (F37) of the video frames 210. F37 is therefore the origin frame 260 of SP1, and audio playout of SP1 should begin substantially simultaneously with video playout of F37. The association of SP1 with F37, graphically depicted as an arrow, can be implemented via one or more pointers, lists, tables, etc., such as an index of F37 that is stored with SP1 (e.g., as metadata for SP1), an index of SP1 stored with F37 (e.g., as metadata for F37), or in a table or list of links that is stored separately from the video frames 210 and from the one or more second audio segments 150, as illustrative, non-limiting examples.

As a second example, SP2 corresponds to an utterance of the person 162 that begins at frame 104 (F104) of the video frames 210. F104 is therefore the origin frame 260 of SP2, and audio playout of SP2 should begin substantially simultaneously with video playout of F104. The association of SP2 with F104, graphically depicted as an arrow, can be implemented in a similar manner as described above.

The length of SP1 represents a time duration for playout of SP1, and the length of SP2 represents a time duration for playout of SP2. For example, the chirp represented by SP1 is shorter than the utterance of the person 162 that is represented by SP2. As illustrated, during playback, SP1 and SP2 do not overlap in time (e.g., playback of SP1 ends prior to the start of playback for SP2). However, in other implementations, two or more of second audio segments 150 may overlap, such as depicted below with reference to FIG. 5.

The one or more second audio segments 150 are indicated as having a speed-adjustable (SA) playback type 230 that corresponds to the second playback type 152. The speed-adjustable playback type 230 indicates that the playback speed of the audio of the one or more second audio segments 150 is to be adjusted to match the speed of video playback.

The one or more first audio segments 140 include a sequence of speed-adjustable segments, including a first segment (SA1) 251, a second segment (SA2) 252, a third segment (SA3) 253, a fourth segment (SA4) 254, a fifth segment (SA5) 255, and a sixth segment (SA6) 256. The one or more second audio segments 150 have substantially equal length and are associated with regularly spaced anchor frames 270 in the video 134. As illustrated, F1 is the anchor frame of SA1, frame 31 (F31) is the anchor frame of SA2, frame 61 (F61) is the anchor frame of SA3, frame 91 (F91) is the anchor frame of SA4, frame 121 (F121) is the anchor frame of SA5, and frame 151 (F151) is the anchor frame of SA6. Because F1 is the anchor frame of SA1, audio playout of SA1 should begin substantially simultaneously with video playout of F1; because F31 is the anchor frame of SA2, audio playout of SA2 should begin (and audio playout of SA1 should end) substantially simultaneously with video playout of F31, etc.

As described further with reference to FIGS. 4 and 5, the audio segments SA1-SA6 may represent a continuous audio sound (e.g., the sound of the brook 168) that spanned the time period from F1 to F180 during recording, and that is divided into segments of equal length and associated with respective anchor frames 270 during generation of the data 132. Beginning playback of each of the segments SA1-SA6 at the respective anchor frames 270 enables the reduction, or elimination, of user-perceivable synchronization drift by re-synchronizing the second audio segments 150 to the video frames 210 at every anchor frame 270.

FIG. 3 depicts an illustrative example 300 of operations and components than can be implemented in audio playback unit 124. As illustrated, the one or more first audio segments 140 and the one or more second audio segments 150 can be provided to a stream generator 310.

The stream generator 310 is configured to process the one or more first audio segments 140 to generate a first audio stream 340 that corresponds to speed-preserved (e.g., non-perceivable) sounds played back at regular speed. The stream generator 310 is also configured to process the one or more second audio segments 150 to generate a second audio stream 350 that corresponds to speed-adjustable (e.g., perceivable) sounds played back at an adjusted speed (e.g., a slower speed for playback with slow motion video). In some implementations, the stream generator 310 is configured to process the one or more first audio segments 140 and the one or more second audio segments 150 in parallel so that generation of the first audio stream 340 and the second audio stream 350 occurs substantially concurrently.

A combiner 320 is configured to process the first audio stream 340 and the second audio stream 350 and to generate an output audio stream 360 corresponding to an overlay of the first audio stream 340 with the second audio stream 350. In a particular implementation, the output audio stream 360 corresponds to the audio output 174.

Thus, the playback of the media stream 130 can include generation of the first audio stream 340 including the one or more first audio segments 140, the second audio stream 350 including the one or more second audio segments 150, and the output audio stream 360 corresponding to an overlay of the first audio stream 340 with the second audio stream 350.

FIG. 4 depicts an example of components 400 that can be included in the system 100 of FIG. 1. The components 400 include one or more cameras 402 configured to generate video data 406 corresponding to a recorded video stream 414, one or more microphones 404 configured to generate audio data 408 corresponding to a recorded audio stream 416, and the media stream data structure generator 170. In a particular example, the one or more cameras 402, the one or more microphones 404, or both, are included in the one or more sensors 104 of FIG. 1.

The media stream data structure generator 170 includes a recorder 410, a neural network 420, and an audio-to-video frame linker 430. The recorder 410 is configured to record the media stream 130 (e.g., the video data 406 and the audio data 408) to generate a recorded media stream 412 that includes the recorded video stream 414 corresponding to the video 134 and the recorded audio stream 416.

The media stream data structure generator 170 is configured to process the recorded audio stream 416 using the neural network 420 to generate multiple audio streams 421. The multiple audio streams 421 include a first audio stream 422 including audio categorized as having the first playback type 142, such as speed-preserved (e.g., non-perceivable) sounds. The multiple audio streams 421 also include a second audio stream 424 including audio categorized as having the second playback type 152, such as speed-adjustable (e.g., perceivable) sounds.

The audio-to-video frame linker 430 is configured to generate a playback structure 432 for the media stream 130 to facilitate playback of the recorded video stream 414 at the second frame rate 138, the first audio stream 422 at the first playback speed 144, and the second audio stream 424 at the second playback speed 154. For example, the playback structure 432 may include the data 132 of FIG. 1 with one or more of the linking mechanisms (e.g., pointers, tables, lists, metadata, etc.) described in FIG. 2 for associating audio segments with respective origin frames and anchor frames.

In some implementations, the audio-to-video frame linker 430 is configured to process the first audio stream 422 differently from the second audio stream 424 when generating the playback structure 432. For example, audio-to-video frame linker 430 is configured to process the recorded video stream 414 to identify, in the recorded video stream 414, an origin frame (e.g., F37 of FIG. 2) associated with a particular segment (e.g., SP1 of FIG. 2) of the first audio stream 422. According to some aspects, the audio-to-video frame linker 430 is configured to identify the origin frame based on a time alignment between the occurrence of a sound in the recorded audio stream 416 and a particular frame of the recorded video stream 414. According to some aspects, the audio-to-video frame linker 430 is configured to identify, in the recorded video stream 414, one or more objects (e.g., the bird 166) from which a sound associated with a beginning of the particular segment originates. The audio-to-video frame linker 430 can associate the particular segment of the first audio stream 422 with the origin frame in the playback structure 432 such that, during playback of the media stream 130, initiation of playback of the particular segment of the first audio stream 422 and initiation of playback of the origin frame are substantially simultaneous (e.g., playout of the chirp, at regular speed, begins when the slow motion playback of the video 134 reaches the origin frame F37).

The audio-to-video frame linker 430 can also assign the first playback speed 144 to the particular segment of the first audio stream 422. For example, the audio-to-video frame linker 430 may set one or more values in the playback structure 432 to assign the first playback speed 144 to audio segments of the first audio stream 422. Alternatively, or in addition, the audio-to-video frame linker 430 may designate audio segments of the first audio stream 422 as having the first playback type 142 or as having the speed-preserved playback type 220, which can indicate that playback is to be performed using the first playback speed 144.

In some implementations, when processing the second audio stream 424 to generate the playback structure 432, the audio-to-video frame linker 430 is configured to identify anchor frames in the recorded video stream 414 based on a length of the recorded video stream 414 and an anchoring frequency 440. In the example of FIG. 2, the anchoring frequency 440 for the anchor frames 270 is 30, and every 30th frame of the video frames 210 may be identified as an anchor frame 270 for the duration of the recorded video stream. In some examples, the anchoring frequency 440 is set to a value based on an expected, modelled, or observed rate of audio synchronization drift to prevent (or reduce the likelihood of) the audio synchronization drift accumulating over time to reach a perceivable amount. In other examples, the anchoring frequency 440 is dynamic. To illustrate, the one or more processors 116 (e.g., the media stream playback engine 120) may compare an amount of audio synchronization drift detected during playback to a drift threshold and may reduce the anchoring frequency 440 based on the detected drift exceeding the drift threshold.

The audio-to-video frame linker 430 may split the second audio stream 424 into a particular number of sequential segments having matching durations, where the particular number of sequential segments is based on a number of identified anchor frames. Using FIG. 2 as an example, upon determining that six anchor frames 270 are identified, the portion of the second audio stream 424 that spans video frames 1-180 is split into the six segments SA1-SA6 having matching durations.

The audio-to-video frame linker 430 may associate a first segment (e.g., SA1) of the sequential segments with a first identified anchor frame (e.g., F1) in the playback structure 432 such that, during playback of the media stream 130, initiation of playback of the first segment of the sequential segments and initiation of playback of the first identified anchor frame are substantially simultaneous, such as described in FIG. 2. The audio-to-video frame linker 430 may also associate a second segment (e.g., SA2) of the sequential segments with a second identified anchor frame (e.g., F31) in the playback structure 432 such that, during playback of the media stream 130, initiation of playback of the second segment and initiation of playback of the second identified anchor frame are substantially simultaneous. Each of the remaining segments of the sequential segments may also be associated with a respective identified anchor frame in the playback structure 432 in a similar manner.

During operation, the media stream data structure generator 170 designates the second audio stream 424 (e.g., the perceivable audio stream) for playback at reduced speed when the video 134 is played as slow motion video. As discussed above, one of the drawbacks to playing back audio at a reduced speed is that audio bytes tend to drift relative to the video. This drift arises because slow motion videos are not simply slow-paced playbacks, but instead are high frame rate recordings that are played back a different rate. Such drift is corrected in the present techniques by anchoring fragments of the perceivable stream to respective anchor video frames. To illustrate, the perceivable audio stream can be stored in the playback structure 432 as a series of several audio sub-streams rather than a single audio stream. Each of the sub-streams starts at (e.g., is anchored to) a respective anchor frame of the video. For example, the sub-streams can be created such that each sub-stream begins playback 30 video frames after the preceding sub-stream began playback (e.g., an anchoring frequency of 30), so that any audio drift is corrected every 30 video frames. The anchoring frequency can be set at an appropriate amount, such as dynamically or trainable, so that no audio drift is perceivable to a user.

In a particular example, a 120 FPS video recording starts at timestamp 00:00 and ends at timestamp 00:01, i.e., a 1-second long video. The length of the full audio stream is 1 second, and the number of frames recorded is 120. The number of anchor frames, assuming an anchoring frequency of 30, can be determined as 120/30, indicating that there are 4 anchor frames. Therefore, the audio is divided into 4 audio sub-streams each of 0.25 seconds. Each audio sub-stream is attached to its respective anchor frame (e.g., at timestamps 00:00, 00:25, 00:50, and 00:75, or at frame numbers 0, 30, 60, and 90). In slow motion playback, each audio sub-stream acts as a simple stream that has reduced playback speed from one anchor frame to the next. preventing accumulation of sync drift to a user-perceivable level.

The media stream data structure generator 170 also segments the first audio stream 422 (e.g., the non-perceivable stream) into sub-streams, and each sub-stream is attached to its respective origin frame and played back at full speed. An example of operation of the media stream data structure generator 170 is further illustrated with reference to FIG. 5.

In a particular implementation, an ignore parameter 426 is used to designate that one or more particular sounds of the recorded audio stream 416 is to be ignored and is not to be included in any of the multiple audio streams 421. For example, when a sound is detected in the recorded audio stream 416 that does not have a corresponding source in the recorded video stream 414 (e.g., an unseen airplane passing overhead, or the voice of a person passing nearby that is not in the scene 160 or interacting with anything in the scene 160), the sound may selected to be ignored by the neural network 420 and omitted during playback. Sounds may be ignored based on whether the sounds have some amount of context to the scene. For example, if something in the scene 160 (e.g., the person 162 or the bird 166) reacts to the sound of a second bird that not in the scene 160, the sound of the second bird may be included in the first audio stream 422; otherwise, the sound of the second bird may be ignored.

The ignore parameter 426 may be set as a trainable parameter. For example, a separate neural network, such as an RNN structure, may be trained to receive the recorded video stream 414 and the recorded audio stream 416 as inputs and to generate an output indicating whether or not an audio signal has context to the scene. Alternatively, or in addition, the ignore parameter 426 may be a manual parameter by which the user can decide which audio should be kept in a final video. In other implementations, all sounds not having sources in the scene may be ignored, using a fixed approach based on basic expectations of an enhanced user experience.

FIG. 5 depicts an example 500 of components and operations that may be performed at the device 102, such as by the media stream data structure generator 170. In FIG. 5, the scene 160 includes the chirping bird 166, the talking person 162, the bouncing ball 164, and the babbling brook 168 that are each captured by the one or more cameras 402 in an image 560 (e.g., a frame of the video data 406) during an HFR recording. The video data 406 and the audio data 408 associated with the HFR recording are provided to the one or more processors 116.

The audio data 408 is processed at an audio feature extractor 502 (e.g., including a fast Fourier transform (FFT) unit 504) to extract audio features 506. The extracted audio features 506 are input to the neural network 420, which includes an RNN. The neural network 420 generates the second audio stream 424 as a "perceivable stream" of audio determined by the neural network 420 to be perceivable when played back at reduced speed, and generates the first audio stream 422 as a "non-perceivable stream" of audio determined to be non-perceivable when played back at reduced speed.

The audio data 408 is graphically illustrated as a signal 520 that is a combination of four signals: a signal 530 corresponding to the bird 166 chirping, a signal 532 corresponding to the person 162 talking, a signal 534 corresponding to the sound of the brook 168, and a signal 536 corresponding to a bounce of the ball 164. As illustrated, audio corresponding to the brook 168 and the ball 164 are output to the second audio stream 424 (the perceivable stream), and audio corresponding to the bird 166 and the person 162 are output to the first audio stream 422 (the non-perceivable stream).

The second audio stream 424 is illustrated as a signal 544 that includes a combination of the signal 534 and the signal 536, illustrated with the timescale expanded to match the slower playback speed/increased playout time associated with slow motion playout of the video data 406. The signal 544 is split into sequential segments (e.g., SA1-SA6 of FIG. 2) that are associated with anchor frames and that are played out at the second playback speed 154.

The first audio stream 422 is partitioned into multiple segments that are associated with origin frames in the video data 406 and that are played out at the first playback speed 144. For example, a signal 542 represents the audio of the bird chirping eight chirps. The signal 542 is segmented into eight sub-streams that are graphically illustrated via rectangular boxes denoting beginning and end points of each segment, such as a representative segment 552. Each of the eight sub-streams is "attached" (e.g., linked via a pointer, frame number, timestamp, etc.) to its corresponding origin frame in the video—that is, the video frame at which each particular chirp begins. Similarly, a signal 540 illustrates that the audio of the person 162 talking is assigned to a single segment 550. The segment 550 is attached to the origin frame in the video that coincides with when the person 162 begins talking.

In conjunction with the above-described systems and techniques, a solution framework for processing the audio data can be summarized in the following steps:

Receive input: receive HFR video and accompanying audio.

Perform audio stream filtering: filter audio segments as perceivable and non-perceivable audio streams.

Generate an audio playback structure: attach full segments of non-perceivable audio streams to their origin frame (the video frame at the start of each audio segment). On the remaining (perceivable) segments, apply anchor frame attachments (e.g., attach the perceivable sub-streams to anchor frames as per the selected anchoring frequency).

Enable playback: perceivable audio streams are played back at the playback speed ratio (high frame rate)/(playback frame rate) for each audio sub stream, i.e. from one anchor frame to another. Each non-perceivable audio segments retains its original playback speed (as one experienced while recording) and is played back starting from the audio segment's origin frame in the video playback.

FIG. 6 illustrates an example of a method 600 including operations to perform coordination of slow motion video with audio. The method 600 includes, at 602, starting recording. The method 600 includes, at 604, recording at a high frame rate with audio, such as using the one or more cameras 402 and the one or more microphones 404.

The method 600 includes, at 606, performing an audio discrimination operation. For example, the audio discrimination operation can be performed by the neural network 420 to generate a non-perceivable audio stream (e.g., the first audio stream 422) and a perceivable audio stream (e.g., the second audio stream 424).

The method 600 includes, at 608, adding the non-perceivable audio stream to the origin frame and maintaining the original playback spend (the playback speed is not linked to the playback speed of the video), such as described with reference to processing the first audio stream 422 at the audio-to-video frame linker 430.

The method 600 also includes, at 610, splitting the perceivable audio stream into sub-streams and attaching the beginning of each sub-stream to its anchor frame, and at 612, linking the playback of each sub-stream of the perceivable audio stream to the video playback speed, such as described with reference to processing the second audio stream 424 at the audio-to-video frame linker 430.

The method 600 includes, at 614, collating the captured video frames with attached audio streams with associated speeds. For example, the collated video frames, audio frames, and associated speeds can be included in the playback structure 432. The method 600 includes, at 616, storing the video. For example, the playback structure 432 can be stored as the data 132.

Figure 7:
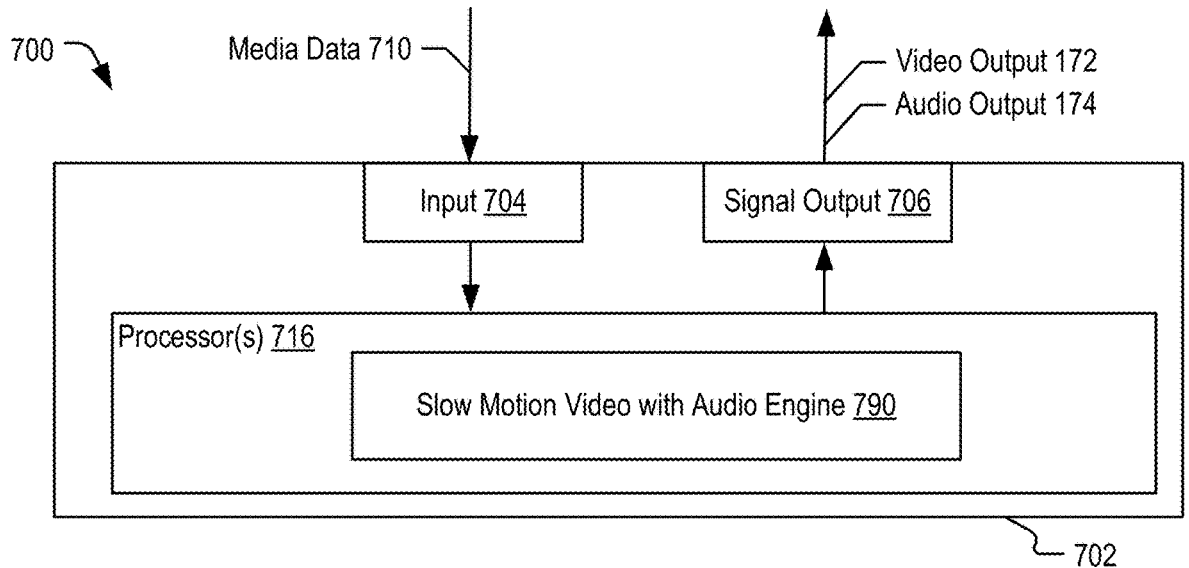
FIG. 7 illustrates an example of an integrated circuit that includes a slow motion video with audio engine, in accordance with some examples of the present disclosure.

FIG. 7 depicts an implementation 700 of the device 102 as an integrated circuit 702 that includes a slow motion video with audio engine 790. The slow motion video with audio engine 790 includes the media stream playback engine 120, the media stream data structure generator 170, or both.

The integrated circuit 702 also includes an input 704, such as one or more bus interfaces, to enable media data 710 to be received for processing. For example, the media data 710 can include the media stream 130, the data 132, or both. The integrated circuit 702 also includes a signal output 706, such as a bus interface, to enable sending of the video output 172 and the audio output 174.

Figure 8:
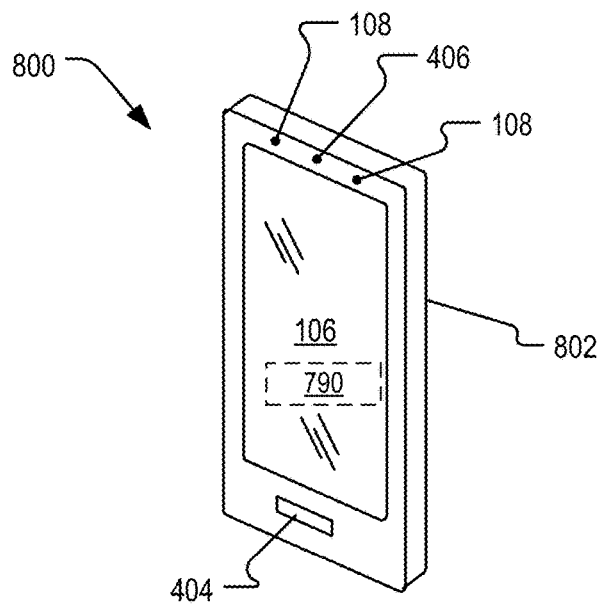
FIG. 8 is a diagram of a mobile device that includes a slow motion video with audio engine, in accordance with some examples of the present disclosure.
Figure 9:
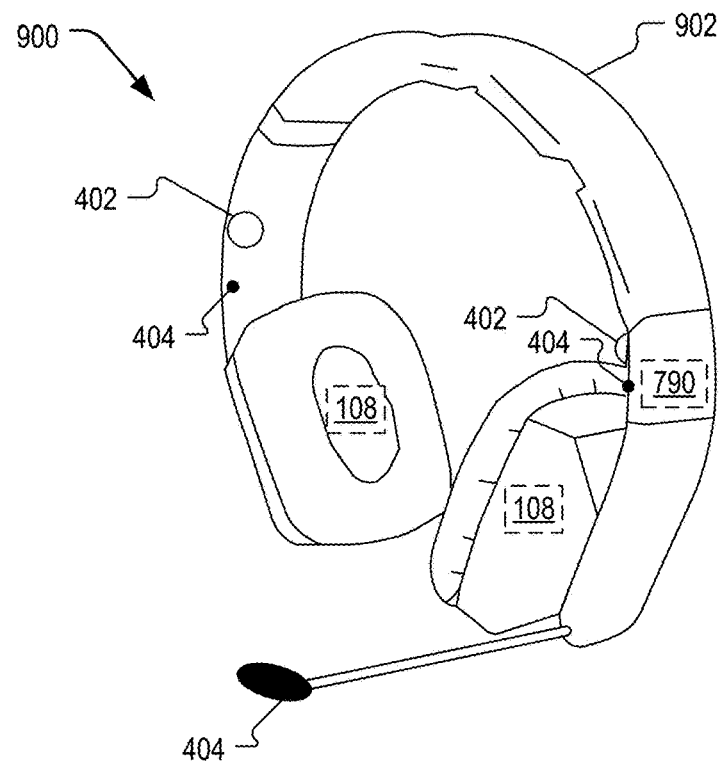
FIG. 9 is a diagram of a headset that includes a slow motion video with audio engine, in accordance with some examples of the present disclosure.
Figure 10:
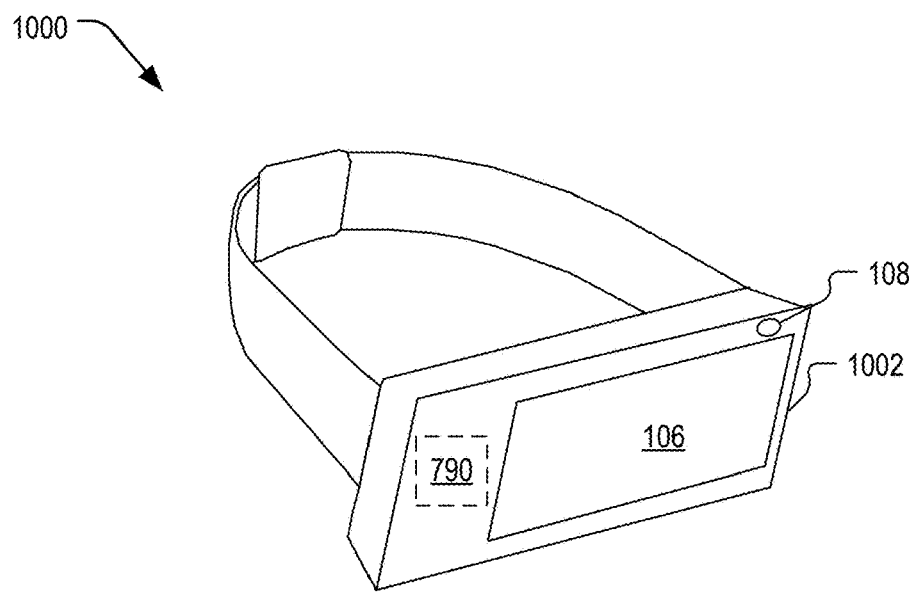
FIG. 10 is a diagram of a wearable electronic device that includes a slow motion video with audio engine, in accordance with some examples of the present disclosure.
Figure 11:
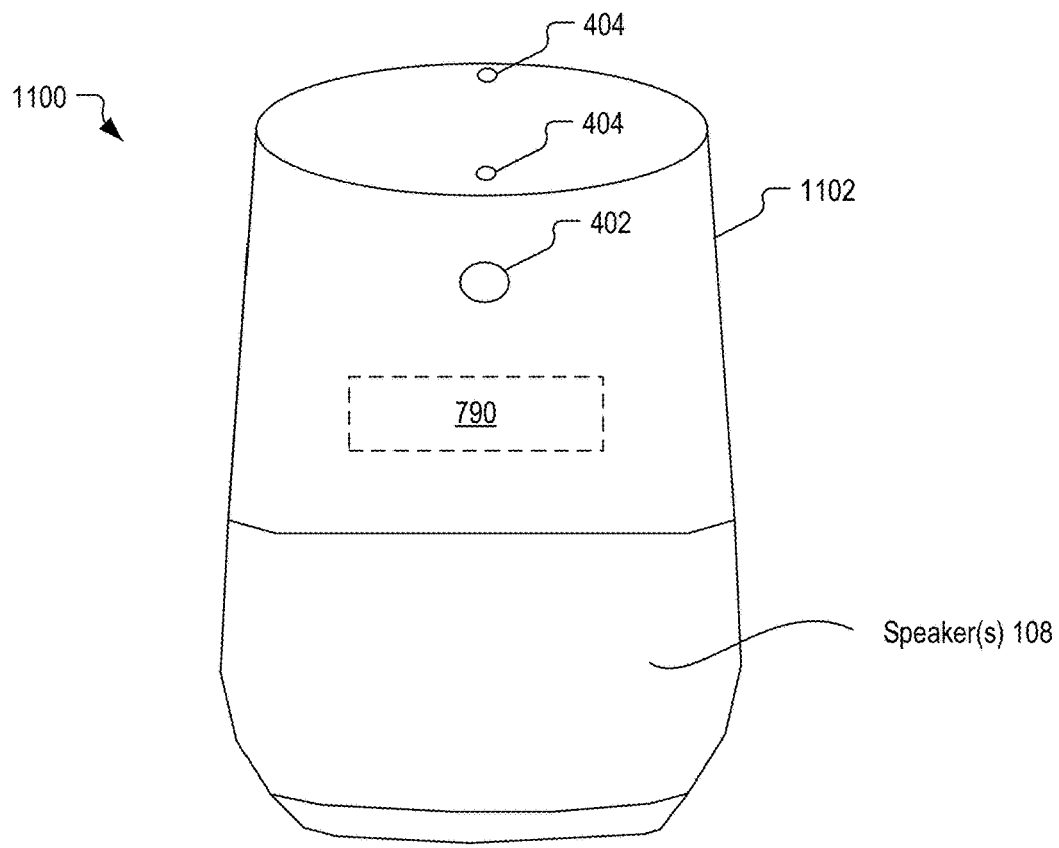
FIG. 11 is a diagram of a voice-controlled speaker system that includes a slow motion video with audio engine, in accordance with some examples of the present disclosure.
Figure 12:
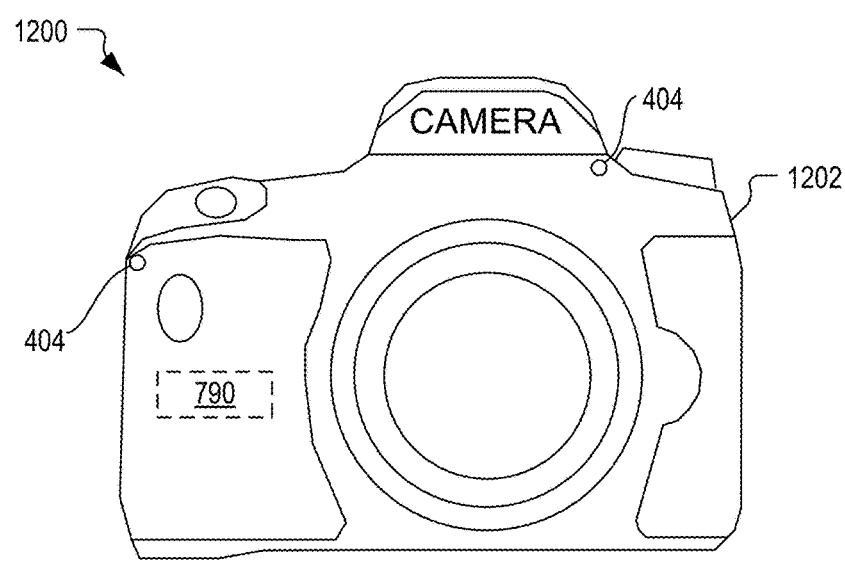
FIG. 12 is a diagram of a camera that includes a slow motion video with audio engine, in accordance with some examples of the present disclosure.
Figure 13:
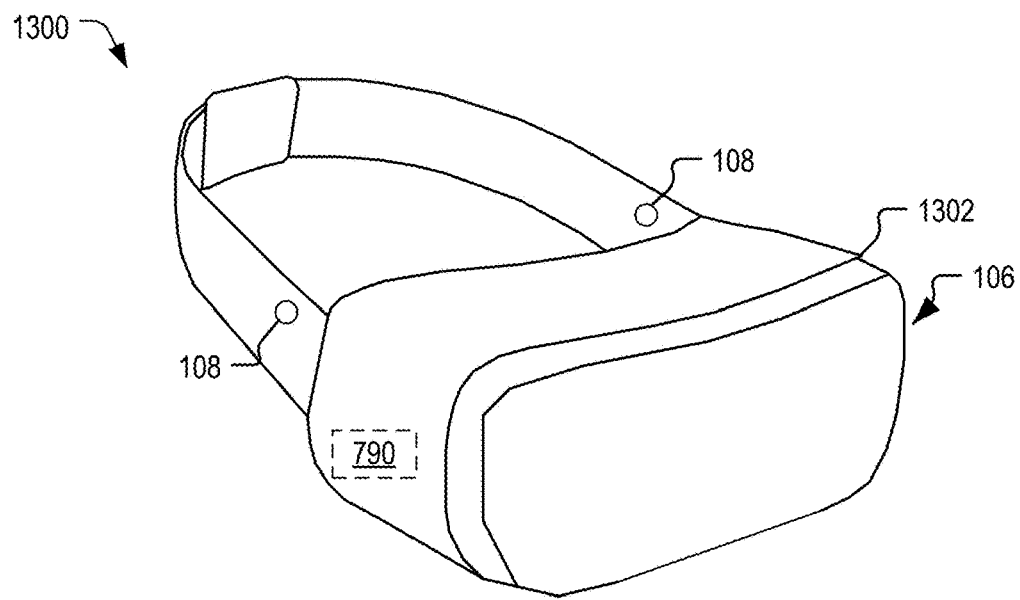
FIG. 13 is a diagram of an extended reality headset, such as a virtual reality, mixed reality, or augmented reality headset, that includes a slow motion video with audio engine, in accordance with some examples of the present disclosure.
Figure 14:
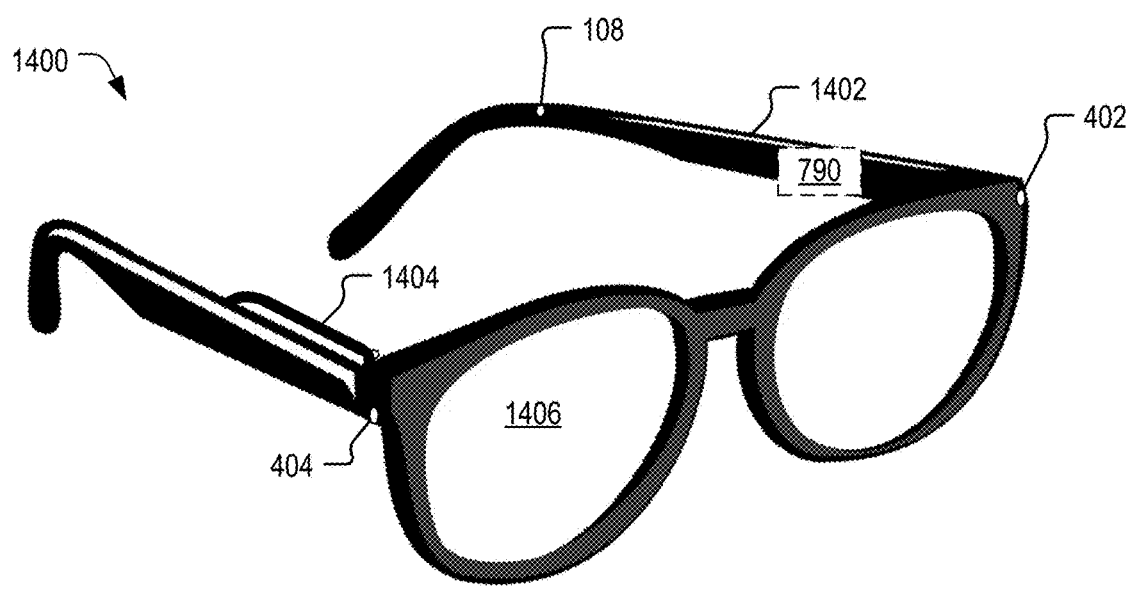
FIG. 14 is a diagram of a mixed reality or augmented reality glasses device that includes a slow motion video with audio engine, in accordance with some examples of the present disclosure.
Figure 15:
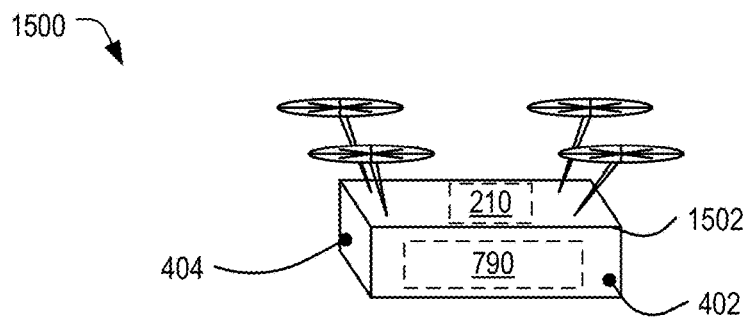
FIG. 15 is a diagram of a first example of a vehicle that includes a slow motion video with audio engine, in accordance with some examples of the present disclosure.
Figure 16:
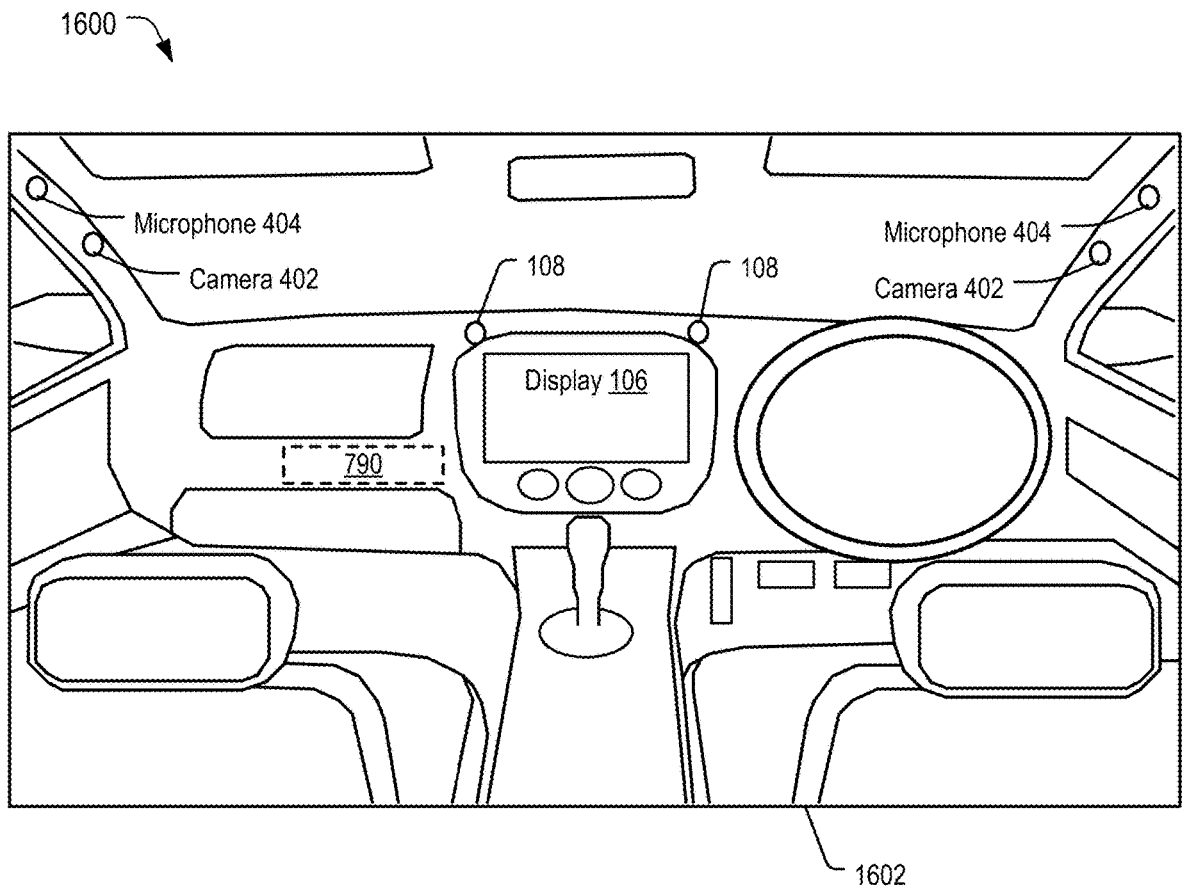
FIG. 16 is a diagram of a second example of a vehicle that includes a slow motion video with audio engine, in accordance with some examples of the present disclosure.

The integrated circuit 702 enables coordination of slow motion video with audio as a component in a system that includes one or more other components, such as a mobile phone or tablet as depicted in FIG. 8, a headset as depicted in FIG. 9, a wearable electronic device as depicted in FIG. 10, a voice-controlled speaker system as depicted in FIG. 11, a camera as depicted in FIG. 12, a virtual reality headset, mixed reality headset, or an augmented reality headset as depicted in FIG. 13, augmented reality glasses or mixed reality glasses as depicted in FIG. 14, or a vehicle as depicted in FIG. 15 or FIG. 16.

FIG. 8 depicts an implementation 800 in which the device 102 is a mobile device 802, such as a phone or tablet, as illustrative, non-limiting examples. The mobile device 802 includes one or more cameras 402, one or more microphones 404, a display device 106 (e.g., a touchscreen), and one or more speakers 108. The slow motion video with audio engine 790 is integrated in the mobile device 802 and is illustrated using dashed lines to indicate internal components that are not generally visible to a user of the mobile device 802. In a particular example, the slow motion video with audio engine 790 may function to generate video output 172 and the audio output 174, which may be output to a viewer via the display device 106 and the one or more speakers 108, respectively.

FIG. 9 depicts an implementation 900 in which the device 102 is a headset device 902. The headset device 902 includes one or more speakers 108, one or more cameras 402, and one or more microphones 404. The slow motion video with audio engine 790 is integrated in the headset device 902. In a particular example, the one or more cameras 402 and the one or more microphones 404 generate the media stream 130. The slow motion video with audio engine 790 may function to generate the audio output 174, which may be played out at the one or more speakers 108, and the video output 172, which the headset device 902 may transmit to a second device (not shown) for display.

FIG. 10 depicts an implementation 1000 in which the device 102 is a wearable electronic device 1002, illustrated as a "smart watch." The slow motion video with audio engine 790, a display device 106, and one or more speakers 108 are integrated into the wearable electronic device 1002. In a particular example, the display device 106 is configured to display the video output 172 and the one or more speakers 108 is configured to play out the audio output 174 generated by the slow motion video with audio engine 790.

FIG. 11 is an implementation 1100 in which the device 102 is a wireless speaker and voice activated device 1102. The wireless speaker and voice activated device 1102 can have wireless network connectivity and is configured to execute an assistant operation. The slow motion video with audio engine 790, one or more speakers 108, one or more cameras 402, and one or more microphones 404, are included in the wireless speaker and voice activated device 1102. During operation, the wireless speaker and voice activated device 1102 may monitor audio captured by the one or more microphones 404 and determine whether a keyword was uttered by a user. In response to a determination that a keyword was uttered, the wireless speaker and voice activated device 1102 can execute assistant operations, such as via execution of an integrated assistant application. The assistant operations can include initiating playback of slow motion video, such as activating the slow motion video with audio engine 790 to generate the audio output 174, which may be played out at the one or more speakers 108, and the video output 172, which the wireless speaker and voice activated device 1102 may transmit to a second device (not shown) for display. The assistant operations can also include adjusting a temperature, playing music, turning on lights, etc. For example, the assistant operations are performed responsive to receiving a command after a keyword or key phrase (e.g., "hello assistant").

FIG. 12 depicts an implementation 1200 in which the device 102 is a portable electronic device that corresponds to a camera device 1202. The slow motion video with audio engine 790 and one or more microphones 404, in addition to one or more image capture devices (e.g., a video capture unit) are included in the camera device 1202. During operation, the slow motion video with audio engine 790 may function to process captured video data and audio data to generate the data 132, which the camera device 1202 may transmit to a second device (not shown) for playback.

FIG. 13 depicts an implementation 1300 in which the device 102 includes a portable electronic device that corresponds to an extended reality ("XR") headset 1302, such as a virtual reality ("VR"), augmented reality ("AR"), or mixed reality ("MR") headset device. The slow motion video with audio engine 790, a display device 106 (e.g., a visual interface device positioned in front of the user's eyes), one or more speakers 108, or a combination thereof, are integrated into the XR headset 1302. The slow motion video with audio engine 790 may function to generate the video output 172 and the audio output 174, the display device 106 is configured to display the video output 172, and the one or more speakers 108 are configured to play out the audio output 174 to enable a user of the XR headset 1302 to experience playback of slow motion video with audio.

FIG. 14 depicts an implementation 1400 in which the device 102 includes a portable electronic device that corresponds to augmented reality or mixed reality glasses 1402. The glasses 1402 include a holographic projection unit 1404 configured to project visual data onto a surface of a lens 1406 or to reflect the visual data off of a surface of the lens 1406 and onto the wearer's retina. The slow motion video with audio engine 790, one or more speakers 108, one or more cameras 402, one or more microphones 404, or a combination thereof, are integrated into the glasses 1402. The slow motion video with audio engine 790 may function to process audio and video data received via the one or more microphones 404 and the one or more cameras 402, respectively, to generate the data 132 (e.g., the playback structure 432), to process the data 132 to generate coordinated slow motion video with audio playback via the holographic projection unit 1404 and the one or more microphones 404, or a combination thereof.

FIG. 15 depicts an implementation 1500 in which disclosed techniques are implemented in a vehicle 1502, illustrated as a manned or unmanned aerial device (e.g., a personal aircraft, a surveillance drone, etc.). The slow motion video with audio engine 790, one or more cameras 402, one or more microphones 404, or a combination thereof, are integrated into the vehicle 1502.

In some implementations in which the vehicle 1502 is configured as a surveillance drone, one or more of the microphones 404 and the cameras 402 may be directed toward a particular person or object being surveilled to capture HFR video and accompanying audio. The slow motion video with audio engine 790 may process the captured HFR video and audio to generate the data 132 (e.g., the playback structure 432), which may be stored at the vehicle 1502 or or transmitted to a second device for playback as coordinated slow motion video with audio.

FIG. 16 depicts another implementation 1600 in which disclosed techniques are implemented in a vehicle 1602, illustrated as a car. The slow motion video with audio engine 790, one or more microphones 404, one or more cameras 402, one or more speakers 108, a display device 106, or a combination thereof, are integrated into the vehicle 1602.

One or more of the microphones 404 and the cameras 402 may be directed toward a user (e.g., an operator or passenger of the vehicle 1602) to capture audio and video of the user, directed outward to capture audio and video of the surrounding environment, or a combination thereof. The captured audio and video (e.g., HFR video) may be processed by the slow motion video with audio engine 790 for playback as coordinated slow motion video with audio via the display device 106 and the one or more speakers 108, transmitted to another device (e.g., a user's computing device, a remote server, etc.) for storage and later playback, or a combination thereof. In some implementations, HFR video recording with audio may be automatically initiated based on one or more motion sensors or other sensors of the vehicle 1602, such as when one or more motion sensors indicate that the vehicle 1602 is undergoing emergency braking, sudden acceleration that may be indicative of a collision, etc.

Figure 17:
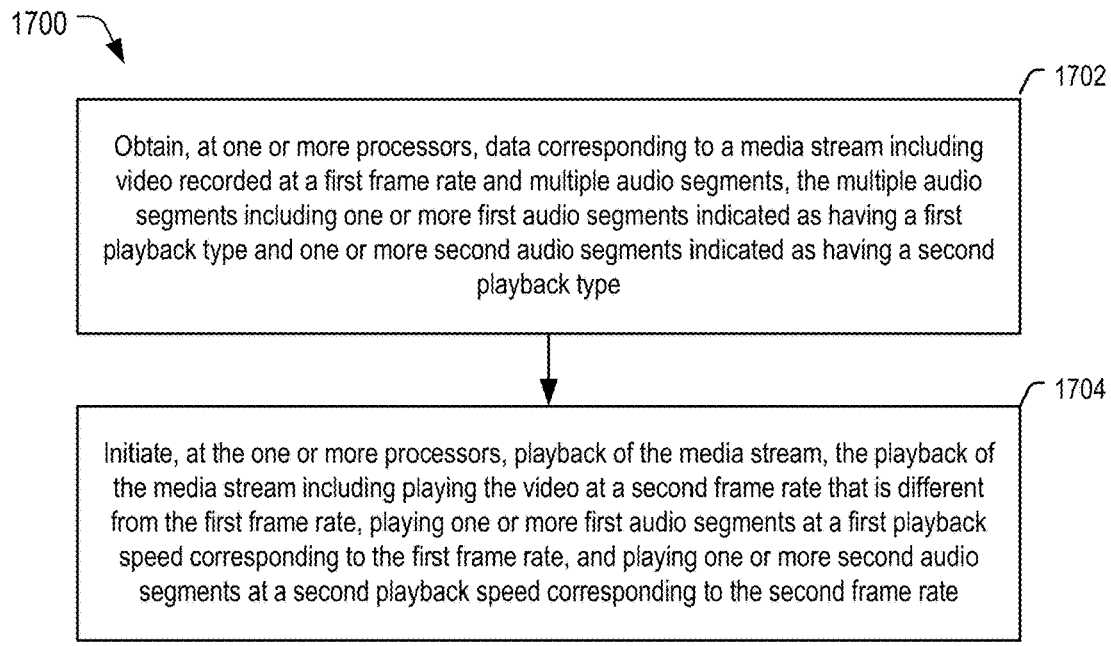
FIG. 17 is a diagram of another particular implementation of a method of coordinating slow motion video with audio, in accordance with some examples of the present disclosure.

FIG. 17 depicts an example of a method 1700 of coordinating adjusted speed video with audio. For example, the method 1700 may be performed by the device 102, such as the media stream playback engine 120.

The method 1700 includes, at 1702, obtaining, at one or more processors, data corresponding to a media stream including video recorded at a first frame rate and multiple audio segments. The multiple audio segments include one or more first audio segments indicated as having a first playback type and one or more second audio segments indicated as having a second playback type. For example, the media stream playback engine 120 obtains the data 132 from the memory 112.

The method 1700 includes, at 1704, initiating, at the one or more processors, playback of the media stream. The playback of the media stream includes playing the video at a second frame rate that is different from the first frame rate, playing one or more first audio segments at a first playback speed corresponding to the first frame rate, and playing one or more second audio segments at a second playback speed corresponding to the second frame rate. For example, the audio playback unit 124 generates the video output 172 at the second frame rate 138 for display at the display device 106 and generates the audio output 174 based on the one or more first audio segments 140 being played out at the first playback speed 144 and the one or more second audio segments 150 being played out at the second playback speed 154.

In some implementations, each of the multiple audio segments is associated with a respective particular frame of the video that represents a playback begin point for that audio segment. For example, each of the one or more first audio segments 140 can be associated with a respective one of the origin frames 260 and each of the one or more second audio segments 150 can be associated with a respective one of the anchor frames 270, as illustrated in FIG. 2. According to some aspects, the one or more second audio segments have substantially equal length and are associated with regularly spaced anchor frames in the video, such as the segments 251-256 associated with the regularly spaced anchor frames 270 of FIG. 2. According to some aspects, each of the one or more first audio segments is associated with a respective origin frame that corresponds to an audio-generating event in the video, such as described with reference to the audio segments 241 and 242 of FIG. 2 and the media stream data structure generator 170 of FIG. 4.

In some implementations, the second frame rate is slower than the first frame rate and the second playback speed is slower than the first playback speed. For example. when the data 132 corresponds to HFR video and accompanying audio, the second frame rate 138 is slower than the first frame rate 136, and the second playback speed 154 for playback of audio indicated as having the second playback type 152 (e.g., perceivable audio) is slower than the first playback speed 144 for playback of audio indicated as having the first playback type 142 (e.g., non-perceivable audio).

By playing audio of the one or more first audio segments having the first playback type using the first playback speed, sound perception issues that can arise from adjusting the playback speed of the audio are avoided. Synchronization drift associated with playing out audio using the second playback speed 154 (e.g., slower than the original speed) can be reduced or eliminated by playing the one or more second audio segments as a sequence of segments that are associated with a sequence of anchor frames in the video. Thus, the method 1700 can be used to provide adjusted-speed playback of videos with enhanced sound quality.

Figure 18:
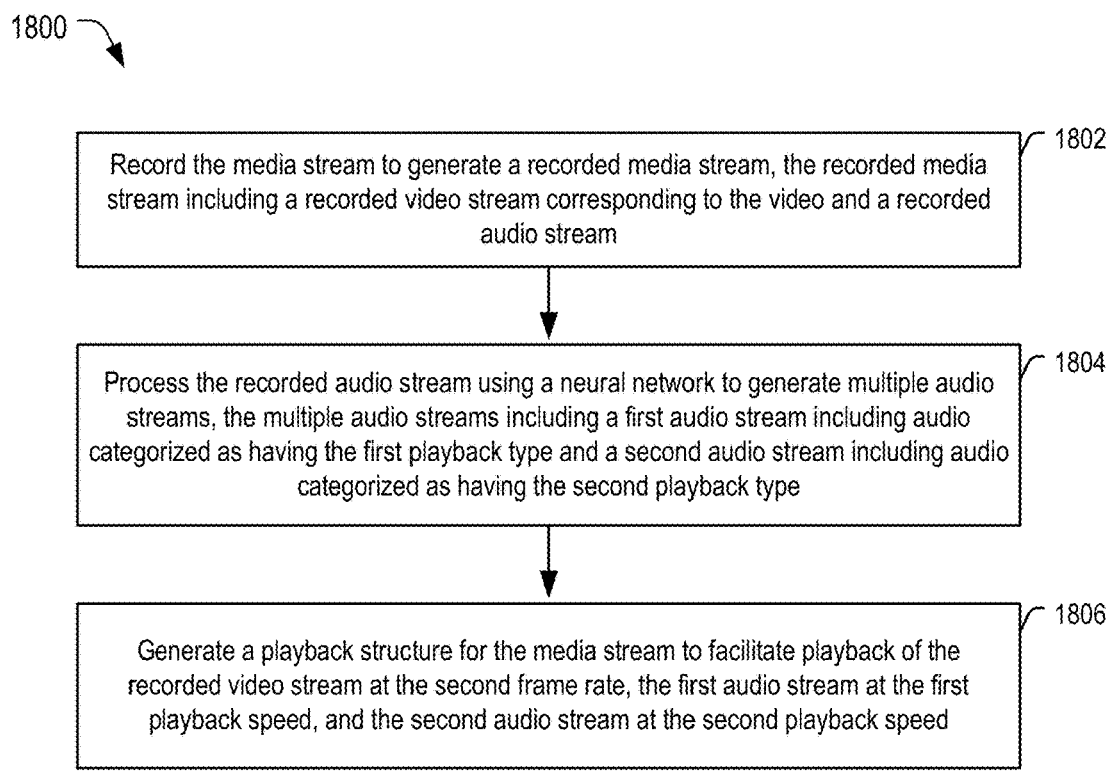
FIG. 18 is a diagram of another particular implementation of a method of coordinating slow motion video with audio, in accordance with some examples of the present disclosure.

FIG. 18 depicts an example of a method 1800 of coordinating adjusted speed video with audio. For example, the method 1800 may be performed by the device 102, such as the media stream data structure generator 170. In a particular implementation, the method 1800 is included in (e.g., is performed as part of) obtaining the data in the method 1700 of FIG. 17.

The method 1800 includes, at 1802, recording the media stream to generate a recorded media stream, the recorded media stream including a recorded video stream corresponding to the video and a recorded audio stream. For example, the recorder 410 of FIG. 4 records the media stream 130 to generate the media stream 412 including the recorded video stream 414 and the recorded audio stream 416.

The method 1800 includes, at 1804, processing the recorded audio stream using a neural network to generate multiple audio streams, the multiple audio streams including a first audio stream including audio categorized as having the first playback type and a second audio stream including audio categorized as having the second playback type. For example, the media stream data structure generator 170 processes the recorded audio stream 416 using the neural network 420 to generate the first audio stream 422 and the second audio stream 424.

The method 1800 includes, at 1806, generating a playback structure for the media stream to facilitate playback of the recorded video stream at the second frame rate, the first audio stream at the first playback speed, and the second audio stream at the second playback speed. For example, the audio-to-video frame linker 430 generates the playback structure 432 for the media stream 130, as described in FIG. 4.

Figure 19:
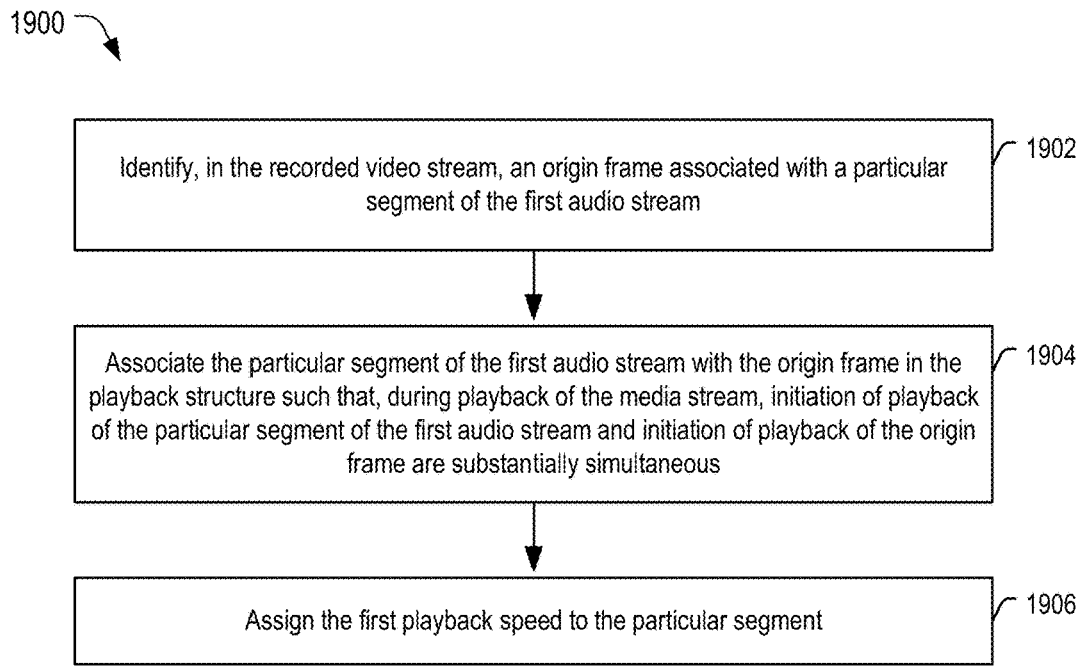
FIG. 19 is a diagram of another particular implementation of a method of coordinating slow motion video with audio, in accordance with some examples of the present disclosure.

FIG. 19 depicts an example of a method 1900 of coordinating adjusted speed video with audio. For example, the method 1900 may be performed by the device 102, such as the media stream data structure generator 170. In a particular implementation, the method 1900 is included in (e.g., is performed as part of) generating the data structure in the method 1800 of FIG. 18.

The method 1900 includes, at 1902, identifying, in the recorded video stream, an origin frame associated with a particular segment of the first audio stream, such as described for the audio-to-video frame linker 430 identifying origin frames for sounds in the first audio stream 422.

The method 1900 includes, at 1904, associating the particular segment of the first audio stream with the origin frame in the playback structure such that, during playback of the media stream, initiation of playback of the particular segment of the first audio stream and initiation of playback of the origin frame are substantially simultaneous. For example, the audio-to-video frame linker 430 generates one or more links, tables, or other metadata to associate segments of the one or more first audio segments 140 to the origin frames, enabling substantially simultaneous playback as described in FIG. 2.

The method 1900 also includes, at 1906, assigning the first playback speed to the particular segment, such as described with reference to the audio-to-video frame linker 430.

Figure 20:
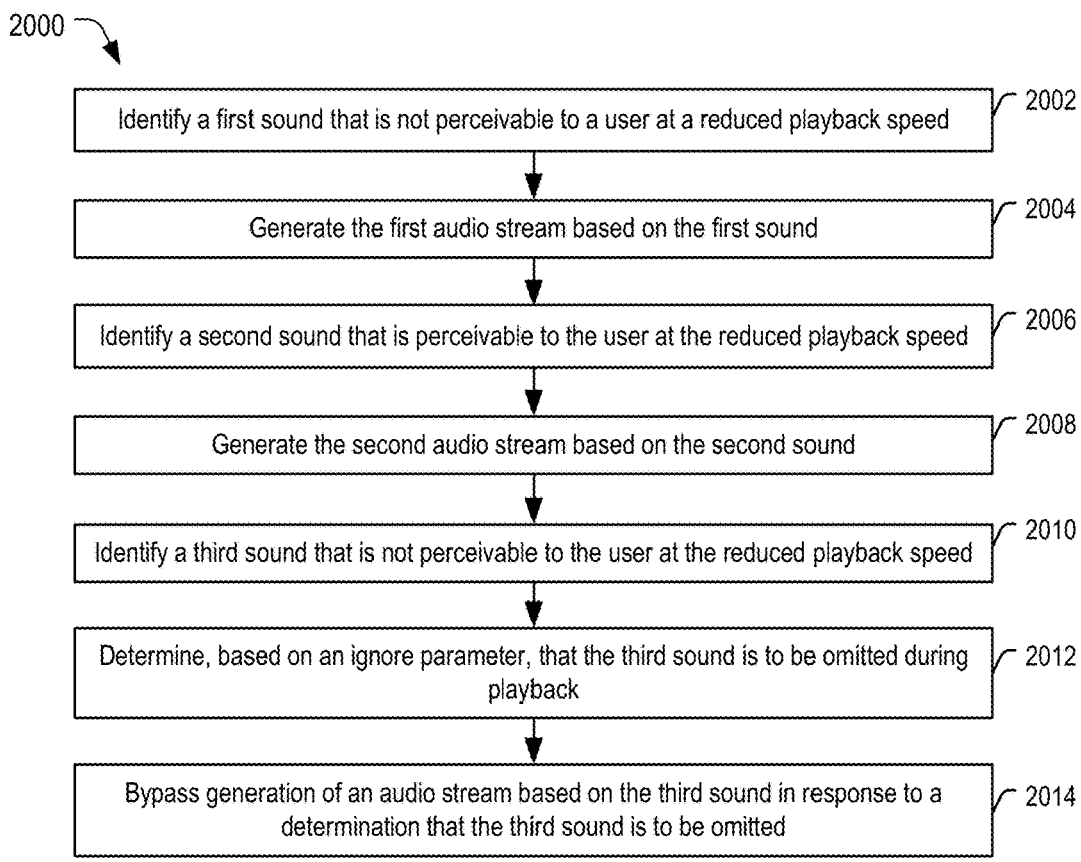
FIG. 20 is a diagram of another particular implementation of a method of coordinating slow motion video with audio, in accordance with some examples of the present disclosure.

FIG. 20 depicts an example of a method 2000 of coordinating adjusted speed video with audio. For example, the method 2000 may be performed by the device 102, such as the media stream data structure generator 170. In a particular implementation, the method 2000 is included in processing the recorded audio stream using the neural network in the method 1800 of FIG. 18.

The method 2000 includes, at 2002, identifying a first sound that is not perceivable to a user at a reduced playback speed and, at 2004, generating the first audio stream based on the first sound. For example, the neural network 420 processes the recorded audio stream 416 to identify non-perceivable sounds (e.g., the speech of the person 162 and the chirping of the bird 166) and outputs the first audio stream 422 based on (e.g., including) the non-perceivable sounds.

The method 2000 includes, at 2006, identifying a second sound that is perceivable to the user at the reduced playback speed and, at 2008, generating the second audio stream based on the second sound. For example, the neural network 420 processes the recorded audio stream 416 to identify perceivable sounds (e.g., the sound of the ball 164 bouncing and the sound of the brook 168) and outputs the second audio stream 424 based on (e.g., including) the perceivable sounds.

The method 2000 includes, at 2012, identifying a third sound that is not perceivable to the user at the reduced playback speed and, at 2014, determining, based on an ignore parameter, that the third sound is to be omitted during playback, such as described with reference to the ignore parameter 426 of FIG. 4.

The method 2000 includes, at 2016, bypassing generation of an audio stream based on the third sound in response to a determination that the third sound is to be omitted. For example, based on the ignore parameter 426 indicating that a particular sound is to be ignored, the neural network 420 does not output the sound into any of the multiple audio streams 421, preventing the sound from being included in the playback structure 432 for later playback.

The method of any or all of FIG. 17, 18, 19, or 20 may be implemented by a field-programmable gate array (FPGA) device, an application-specific integrated circuit (ASIC), a processing unit such as a central processing unit (CPU), a digital signal processing unit (DSP), a controller, another hardware device, firmware device, or any combination thereof. As an example, any one or more of the methods of FIGS. 17-20 may be performed by a processor that executes instructions, such as described with reference to FIG. 21.

Figure 21:
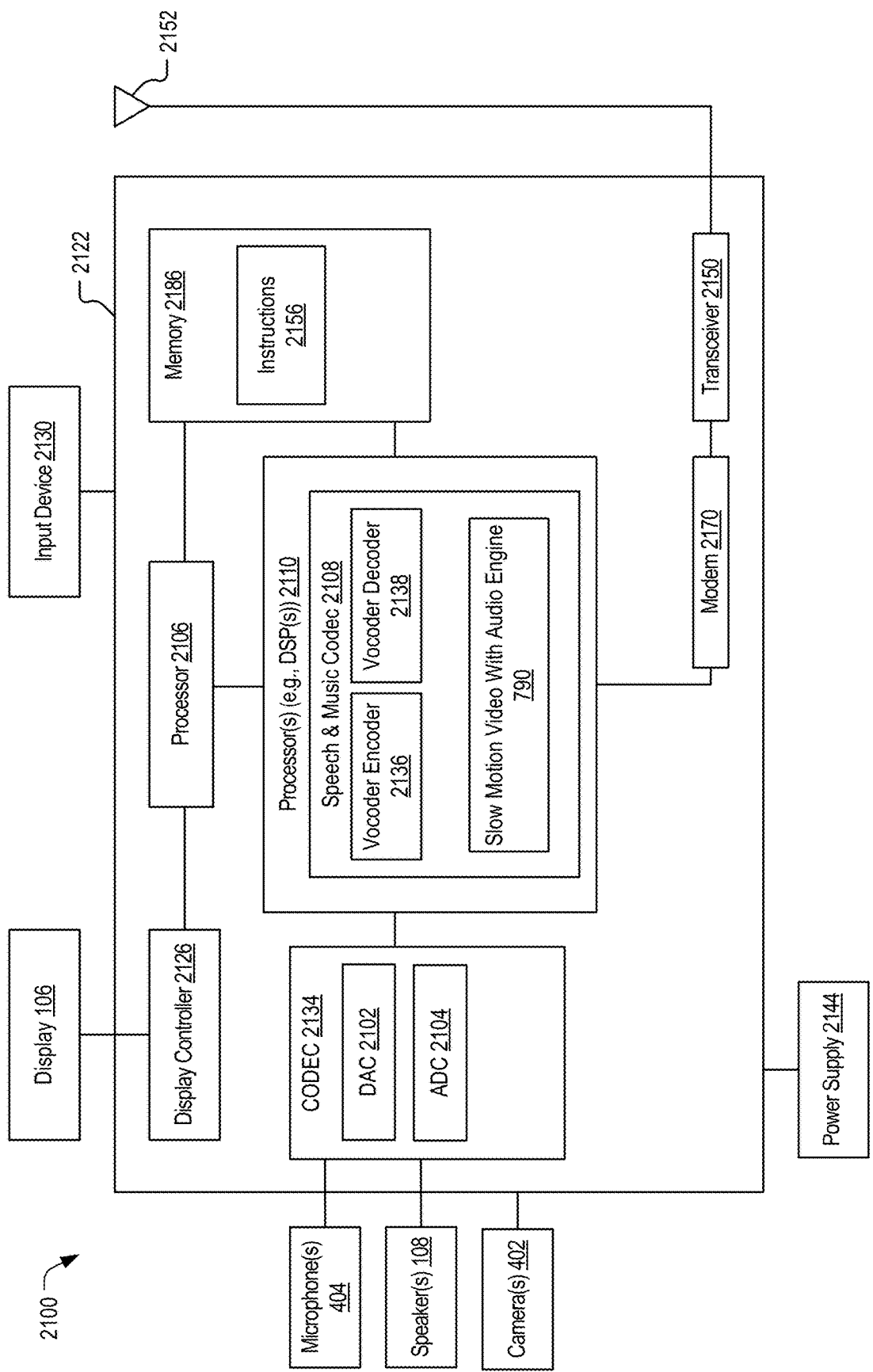
FIG. 21 is a block diagram of a particular illustrative example of a device that is operable to coordinate slow motion video with audio, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to the device 102. In an illustrative implementation, the device 2100 may perform one or more operations described with reference to FIGS. 1-20.

In a particular implementation, the device 2100 includes a processor 2106 (e.g., a CPU). The device 2100 may include one or more additional processors 2110 (e.g., one or more DSPs). In a particular aspect, the processor(s) 116 corresponds to the processor 2106, the processors 2110, or a combination thereof. The processors 2110 may include a speech and music coder-decoder (CODEC) 2108 that includes a voice coder ("vocoder") encoder 2136, a vocoder decoder 2138, the slow motion video with audio engine 790, or a combination thereof.

The device 2100 may include a memory 2186 and a CODEC 2134. The memory 2186 may include instructions 2156, that are executable by the one or more additional processors 2110 (or the processor 2106) to implement the functionality described with reference to the slow motion video with audio engine 790. In a particular aspect, the memory 2186 corresponds to the memory 112. The device 2100 may include a modem 2170 coupled, via a transceiver 2150, to an antenna 2152. The modem 2170 may be configured to transmit a signal to a second device (not shown), receive a signal from the second device, or both. According to a particular implementation, the modem 2170 may correspond to the modem 190 of FIG. 1.

The device 2100 may include a display device 106 coupled to a display controller 2126. The one or more speakers 108 and the one or more microphones 404 may be coupled to the CODEC 2134. The CODEC 2134 may include a digital-to-analog converter (DAC) 2102, an analog-to-digital converter (ADC) 2104, or both. In a particular implementation, the CODEC 2134 may receive analog signals from the one or more microphones 404, convert the analog signals to digital signals using the analog-to-digital converter 2104, and provide the digital signals to the speech and music codec 2108. The speech and music codec 2108 may process the digital signals, and the digital signals may further be processed by the slow motion video with audio engine 790. In a particular implementation, the speech and music codec 2108 may provide digital signals to the CODEC 2134. The CODEC 2134 may convert the digital signals to analog signals using the digital-to-analog converter 2102 and may provide the analog signals to the one or more speakers 108.

In a particular implementation, the device 2100 may be included in a system-in-package or system-on-chip device 2122. In a particular implementation, the memory 2186, the processor 2106, the processors 2110, the display controller 2126, the CODEC 2134, and the modem 2170 are included in a system-in-package or system-on-chip device 2122. In a particular implementation, an input device 2130, the one or more cameras 402, and a power supply 2144 are coupled to the system-on-chip device 2122. Moreover, in a particular implementation, as illustrated in FIG. 21, the display device 106, the input device 2130, the one or more speakers 108, the one or more microphones 404, the one or more cameras 402, the antenna 2152, and the power supply 2144 are external to the system-on-chip device 2122. In a particular implementation, each of the display device 106, the input device 2130, the one or more speakers 108, the one or more microphones 404, the one or more cameras 402, the antenna 2152, and the power supply 2144 may be coupled to a component of the system-on-chip device 2122, such as an interface or a controller.

The device 2100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, an extended reality (XR) device, a base station, a mobile device, or any combination thereof.

In conjunction with the described implementations, an apparatus includes means for storing data corresponding to a media stream including video recorded at a first frame rate and multiple audio segments, the multiple audio segments including one or more first audio segments indicated as having a first playback type and one or more second audio segments indicated as having a second playback type. For example, the means for storing data can correspond to the memory 112, the one or more processors 116 or components thereof (e.g., one or more caches or buffers coupled to or integrated in the media stream playback engine 120, the media stream data structure generator 170, or both), the media stream playback engine 120, the audio playback unit 124, the memory 2186, the processor 2106, the processor(s) 2110, one or more other circuits or components configured to store data corresponding to the media stream, or any combination thereof.

The apparatus also includes means for initiating playback of the media stream, the playback of the media stream including playback of the video at a second frame rate that is different from the first frame rate, playback of one or more first audio segments at a first playback speed corresponding to the first frame rate, and playback one or more second audio segments at a second playback speed corresponding to the second frame rate. For example, the means for initiating playback of the media stream can correspond to the one or more processors 116, the media stream playback engine 120, the video playback unit 122. the audio playback unit 124, the display device 106, the one or more speakers 108, the processor 2106, the processor(s) 2110, one or more other circuits or components configured to initiate playback of the media stream, or any combination thereof.

In some implementations, a non-transitory computer-readable medium (e.g., the memory 2186) includes instructions (e.g., the instructions 2156) that, when executed by one or more processors (e.g., the one or more processors 116), cause the one or more processors to obtain data (e.g., the data 132) corresponding to a media stream (e.g., the media stream 130) including video (e.g., the video 134) recorded at a first frame rate (e.g., the first frame rate 136) and multiple audio segments including one or more first audio segments (e.g., the one or more first audio segments 140) indicated as having a first playback type (e.g., the first playback type 142) and one or more second audio segments (e.g., the one or more second audio segments 150) indicated as having a second playback type (e.g., the second playback type 152). The instructions, when executed by the one or more processors, also cause the one or more processors to initiate playback of the media stream, the playback of the media stream including playback of the video at a second frame rate (e.g., the second frame rate 138) that is different from the first frame rate, playback of the one or more first audio segments at a first playback speed (e.g., the first playback speed 144) corresponding to the first frame rate, and playback of the one or more second audio segments at a second playback speed (e.g., the second playback speed 154) corresponding to the second frame rate.

This disclosure includes the following set of examples.

According to example 1, a device includes: a memory configured to store data corresponding to a media stream including: video recorded at a first frame rate; and multiple audio segments including one or more first audio segments indicated as having a first playback type and one or more second audio segments indicated as having a second playback type; and one or more processors coupled to the memory and operably configured to initiate playback of the media stream, the playback of the media stream including: playback of the video at a second frame rate that is different from the first frame rate; playback of the one or more first audio segments at a first playback speed corresponding to the first frame rate; and playback of the one or more second audio segments at a second playback speed corresponding to the second frame rate.

Example 2 includes the device of example 1, wherein the first playback type corresponds to a speed-preserved playback type, and wherein the second playback type corresponds to a speed-adjustable playback type.

Example 3 includes the device of example 1 or example 2, wherein each of the multiple audio segments is associated with a respective particular frame of the video that represents a playback begin point for that audio segment.

Example 4 includes the device of example 3, wherein the one or more second audio segments have substantially equal length and are associated with regularly spaced anchor frames in the video.

Example 5 includes the device of example 3 or example 4, wherein each of the one or more first audio segments is associated with a respective origin frame that corresponds to an audio-generating event in the video.

Example 6 includes the device of any of examples 1 to 5, wherein the second frame rate is slower than the first frame rate and the second playback speed is slower than the first playback speed.

Example 7 includes the device of any of examples 1 to 6, wherein the playback of the media stream includes generation of a first audio stream including the one or more first audio segments, a second audio stream including the one or more second audio segments, and an output audio stream corresponding to an overlay of the first audio stream with the second audio stream.

Example 8 includes the device of any of examples 1 to 7, wherein, to obtain the data, the one or more processors are configured to: record the media stream to generate a recorded media stream, the recorded media stream comprising a recorded video stream corresponding to the video and a recorded audio stream; process the recorded audio stream using a neural network to generate multiple audio streams, the multiple audio streams including a first audio stream including audio categorized as having the first playback type and a second audio stream including audio categorized as having the second playback type; and generate a playback structure for the media stream to facilitate playback of the recorded video stream at the second frame rate, the first audio stream at the first playback speed, and the second audio stream at the second playback speed.

Example 9 includes the device of example 8, wherein, to generate the playback structure, the one or more processors are configured to: identify, in the recorded video stream, an origin frame associated with a particular segment of the first audio stream; associate the particular segment of the first audio stream with the origin frame in the playback structure such that, during playback of the media stream, initiation of playback of the particular segment of the first audio stream and initiation of playback of the origin frame are substantially simultaneous; and assign the first playback speed to the particular segment.

Example 10 includes the device of example 9, wherein, to identify the origin frame associated with the particular segment, the one or more processors are configured to identify, in the recorded video stream, one or more objects from which a sound associated with a beginning of the particular segment originates.

Example 11 includes the device of any of examples 8 to 10, wherein, to generate the playback structure, the one or more processors are configured to: identify anchor frames in the recorded video stream based on a length of the recorded video stream and an anchoring frequency; split the second audio stream into a particular number of sequential segments having matching durations, the particular number of sequential segments based on a number of identified anchor frames; associate a first segment of the sequential segments with a first identified anchor frame in the playback structure such that, during playback of the media stream, initiation of playback of the first segment of the sequential segments and initiation of playback of the first identified anchor frame are substantially simultaneous; and associate a second segment of the sequential segments with a second identified anchor frame in the playback structure such that, during playback of the media stream, initiation of playback of the second segment and initiation of playback of the second identified anchor frame are substantially simultaneous.

Example 12 includes the device of example 11, wherein the anchoring frequency is dynamic.

Example 13 includes the device of any of examples 8 to 12, wherein the neural network comprises a recurrent neural network.

Example 14 includes the device of any of examples 8 to 13, further comprising one or more cameras configured to generate video data corresponding to the recorded video stream.

Example 15 includes the device of any of examples 8 to 14, further comprising one or more microphones configured to generate audio data corresponding to the recorded audio stream.

Example 16 includes the device of any of examples 1 to 15, further comprising a modem coupled to the one or more processors, the modem configured to receive the media stream from a second device.

Example 17 includes the device of any of examples 1 to 16, wherein the one or more processors are integrated in at least one of a mobile phone, a tablet computer device, a wearable electronic device, or a camera device.

Example 18 includes the device of any of examples 1 to 16, wherein the one or more processors are integrated in a virtual reality headset, a mixed reality headset, or an augmented reality headset.

Example 19 includes the device of any of examples 1 to 16, wherein the one or more processors are integrated in a vehicle.

According to example 20, a method includes: obtaining, at one or more processors, data corresponding to a media stream including video recorded at a first frame rate and multiple audio segments, the multiple audio segments including one or more first audio segments indicated as having a first playback type and one or more second audio segments indicated as having a second playback type; and initiating, at the one or more processors, playback of the media stream, the playback of the media stream including: playing the video at a second frame rate that is different from the first frame rate; playing one or more first audio segments at a first playback speed corresponding to the first frame rate; and playing one or more second audio segments at a second playback speed corresponding to the second frame rate.

Example 21 includes the method of example 20, wherein each of the multiple audio segments is associated with a respective particular frame of the video that represents a playback begin point for that audio segment.

Example 22 includes the method of example 21, wherein the one or more second audio segments have substantially equal length and are associated with regularly spaced anchor frames in the video.

Example 23 includes the method of example 21 or example 22, wherein each of the one or more first audio segments is associated with a respective origin frame that corresponds to an audio-generating event in the video.

Example 24 includes the method of any of examples 20 to 23, wherein the second frame rate is slower than the first frame rate and the second playback speed is slower than the first playback speed.

Example 25 includes the method of any of examples 20 to 24, wherein obtaining the data includes: recording the media stream to generate a recorded media stream, the recorded media stream comprising a recorded video stream corresponding to the video and a recorded audio stream; processing the recorded audio stream using a neural network to generate multiple audio streams, the multiple audio streams including a first audio stream including audio categorized as having the first playback type and a second audio stream including audio categorized as having the second playback type; and generating a playback structure for the media stream to facilitate playback of the recorded video stream at the second frame rate, the first audio stream at the first playback speed, and the second audio stream at the second playback speed.

Example 26 includes the method of example 25, wherein generating the playback structure includes: identifying, in the recorded video stream, an origin frame associated with a particular segment of the first audio stream; associating the particular segment of the first audio stream with the origin frame in the playback structure such that, during playback of the media stream, initiation of playback of the particular segment of the first audio stream and initiation of playback of the origin frame are substantially simultaneous; and assigning the first playback speed to the particular segment.

Example 27 includes the method of example 25 or example 26, wherein processing the recorded audio stream using the neural network includes: identifying a first sound that is not perceivable to a user at a reduced playback speed; generating the first audio stream based on the first sound; identifying a second sound that is perceivable to the user at the reduced playback speed; generating the second audio stream based on the second sound; identifying a third sound that is not perceivable to the user at the reduced playback speed; determining, based on an ignore parameter, that the third sound is to be omitted during playback; and bypassing generation of an audio stream based on the third sound in response to a determination that the third sound is to be omitted.

According to example 28, a non-transitory computer-readable medium includes instructions that, when executed by one or more processors, cause the one or more processors to: obtain data corresponding to a media stream including: video recorded at a first frame rate; and multiple audio segments including one or more first audio segments indicated as having a first playback type and one or more second audio segments indicated as having a second playback type; and initiate playback of the media stream, the playback of the media stream including: playback of the video at a second frame rate that is different from the first frame rate; playback of the one or more first audio segments at a first playback speed corresponding to the first frame rate; and playback of the one or more second audio segments at a second playback speed corresponding to the second frame rate.

Example 29 includes the non-transitory computer-readable medium of example 28, wherein, to obtain the data, the instructions cause the one or more processors to: record the media stream to generate a recorded media stream, the recorded media stream comprising a recorded video stream corresponding to the video and a recorded audio stream; process the recorded audio stream using a neural network to generate multiple audio streams, the multiple audio streams including a first audio stream including audio categorized as having the first playback type and a second audio stream including audio categorized as having the second playback type; and generate a playback structure for the media stream to facilitate playback of the recorded video stream at the second frame rate, the first audio stream at the first playback speed, and the second audio stream at the second playback speed.

According to example 30, an apparatus includes: means for storing data corresponding to a media stream including video recorded at a first frame rate and multiple audio segments, the multiple audio segments including one or more first audio segments indicated as having a first playback type and one or more second audio segments indicated as having a second playback type; and means for initiating playback of the media stream, the playback of the media stream including: playback of the video at a second frame rate that is different from the first frame rate; playback of one or more first audio segments at a first playback speed corresponding to the first frame rate; and playback one or more second audio segments at a second playback speed corresponding to the second frame rate.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed upon the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor includes the processor and the storage medium may reside in an application-specific integrated circuit (ASIC) includes the ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following examples.

What is claimed is:

1. A device comprising:
    a memory configured to store data corresponding to a media stream including:
        video recorded at a first frame rate; and
        multiple audio segments including one or more first audio segments indicated as having a first playback type and one or more second audio segments indicated as having a second playback type; and
    one or more processors coupled to the memory and operably configured to:
        record the media stream to generate a recorded media stream, the recorded media stream comprising a recorded video stream corresponding to the video and a recorded audio stream;
        process the recorded audio stream using a neural network to generate multiple audio streams, the multiple audio streams including a first audio stream including audio categorized as having the first playback type and a second audio stream including audio categorized as having the second playback type; and
        initiate playback of the media stream, the playback of the media stream including:
            playback of the video at a second frame rate that is different from the first frame rate;
            playback of the one or more first audio segments at a first playback speed corresponding to the first frame rate; and
            playback of the one or more second audio segments at a second playback speed corresponding to the second frame rate.

2. The device of claim 1, wherein the first playback type corresponds to a speed-preserved playback type, and wherein the second playback type corresponds to a speed-adjustable playback type.

3. The device of claim 1, wherein each of the multiple audio segments is associated with a respective particular frame of the video that represents a playback begin point for that audio segment.

4. The device of claim 3, wherein the one or more second audio segments have substantially equal length and are associated with regularly spaced anchor frames in the video.

5. The device of claim 3, wherein each of the one or more first audio segments is associated with a respective origin frame that corresponds to an audio-generating event in the video.

6. The device of claim 1, wherein the second frame rate is slower than the first frame rate and the second playback speed is slower than the first playback speed.

7. The device of claim 1, wherein the playback of the media stream includes generation of a first audio stream including the one or more first audio segments, a second audio stream including the one or more second audio segments, and an output audio stream corresponding to an overlay of the first audio stream with the second audio stream.

8. The device of claim 1, wherein, to obtain the data, the one or more processors are configured to:
    generate a playback structure for the media stream to facilitate playback of the recorded video stream at the second frame rate, the first audio stream at the first playback speed, and the second audio stream at the second playback speed.

9. The device of claim 8, wherein, to generate the playback structure, the one or more processors are configured to:
    identify, in the recorded video stream, an origin frame associated with a particular segment of the first audio stream;
    associate the particular segment of the first audio stream with the origin frame in the playback structure such that, during playback of the media stream, initiation of playback of the particular segment of the first audio stream and initiation of playback of the origin frame are substantially simultaneous; and
    assign the first playback speed to the particular segment.

10. The device of claim 9, wherein, to identify the origin frame associated with the particular segment, the one or more processors are configured to identify, in the recorded video stream, one or more objects from which a sound associated with a beginning of the particular segment originates.

11. The device of claim 8, wherein, to generate the playback structure, the one or more processors are configured to:
    identify anchor frames in the recorded video stream based on a length of the recorded video stream and an anchoring frequency;
    split the second audio stream into a particular number of sequential segments having matching durations, the particular number of sequential segments based on a number of identified anchor frames;
    associate a first segment of the sequential segments with a first identified anchor frame in the playback structure such that, during playback of the media stream, initiation of playback of the first segment of the sequential segments and initiation of playback of the first identified anchor frame are substantially simultaneous; and associate a second segment of the sequential segments with a second identified anchor frame in the playback structure such that, during playback of the media stream, initiation of playback of the second segment and initiation of playback of the second identified anchor frame are substantially simultaneous.

12. The device of claim 11, wherein the anchoring frequency is dynamic.

13. The device of claim 8, wherein the neural network comprises a recurrent neural network.

14. The device of claim 8, further comprising one or more cameras configured to generate video data corresponding to the recorded video stream.

15. The device of claim 8, further comprising one or more microphones configured to generate audio data corresponding to the recorded audio stream.

16. The device of claim 1, further comprising a modem coupled to the one or more processors, the modem configured to receive the media stream from a second device.

17. The device of claim 1, wherein the one or more processors are integrated in at least one of a mobile phone, a tablet computer device, a wearable electronic device, or a camera device.

18. The device of claim 1, wherein the one or more processors are integrated in a virtual reality headset, a mixed reality headset, or an augmented reality headset.

19. The device of claim 1, wherein the one or more processors are integrated in a vehicle.

20. A method comprising:
   obtaining, at one or more processors, data corresponding to a media stream including video recorded at a first frame rate and multiple audio segments, the multiple audio segments including one or more first audio segments indicated as having a first playback type and one or more second audio segments indicated as having a second playback type;
   recording the media stream to generate a recorded media stream, the recorded media stream comprising a recorded video stream corresponding to the video and a recorded audio stream;
   processing the recorded audio stream using a neural network to generate multiple audio streams, the multiple audio streams including a first audio stream including audio categorized as having the first playback type and a second audio stream including audio categorized as having the second playback type; and
   initiating, at the one or more processors, playback of the media stream, the playback of the media stream including:
      playing the video at a second frame rate that is different from the first frame rate;
      playing one or more first audio segments at a first playback speed corresponding to the first frame rate; and
      playing one or more second audio segments at a second playback speed corresponding to the second frame rate.

21. The method of claim 20, wherein each of the multiple audio segments is associated with a respective particular frame of the video that represents a playback begin point for that audio segment.

22. The method of claim 21, wherein the one or more second audio segments have substantially equal length and are associated with regularly spaced anchor frames in the video.

23. The method of claim 21, wherein each of the one or more first audio segments is associated with a respective origin frame that corresponds to an audio-generating event in the video.

24. The method of claim 20, wherein the second frame rate is slower than the first frame rate and the second playback speed is slower than the first playback speed.

25. The method of claim 20, wherein obtaining the data includes:
   generating a playback structure for the media stream to facilitate playback of the recorded video stream at the second frame rate, the first audio stream at the first playback speed, and the second audio stream at the second playback speed.

26. The method of claim 25, wherein generating the playback structure includes:
   identifying, in the recorded video stream, an origin frame associated with a particular segment of the first audio stream;
   associating the particular segment of the first audio stream with the origin frame in the playback structure such that, during playback of the media stream, initiation of playback of the particular segment of the first audio stream and initiation of playback of the origin frame are substantially simultaneous; and
   assigning the first playback speed to the particular segment.

27. The method of claim 25, wherein processing the recorded audio stream using the neural network comprises:
   identifying a first sound that is not perceivable to a user at a reduced playback speed;
   generating the first audio stream based on the first sound;
   identifying a second sound that is perceivable to the user at the reduced playback speed;
   generating the second audio stream based on the second sound;
   identifying a third sound that is not perceivable to the user at the reduced playback speed;
   determining, based on an ignore parameter, that the third sound is to be omitted during playback; and
   bypassing generation of an audio stream based on the third sound in response to a determination that the third sound is to be omitted.

28. A non-transitory computer-readable medium comprising instructions that, when executed by one or more processors, cause the one or more processors to:
   obtain data corresponding to a media stream including:
      video recorded at a first frame rate; and
      multiple audio segments including one or more first audio segments indicated as having a first playback type and one or more second audio segments indicated as having a second playback type;
   record the media stream to generate a recorded media stream, the recorded media stream comprising a recorded video stream corresponding to the video and a recorded audio stream;
   process the recorded audio stream using a neural network to generate multiple audio streams, the multiple audio streams including a first audio stream including audio categorized as having the first playback type and a second audio stream including audio categorized as having the second playback type; and
   initiate playback of the media stream, the playback of the media stream including:
      playback of the video at a second frame rate that is different from the first frame rate;

playback of the one or more first audio segments at a first playback speed corresponding to the first frame rate; and playback of the one or more second audio segments at a second playback speed corresponding to the second frame rate.

29. The non-transitory computer-readable medium of claim 28, wherein, to obtain the data, the instructions cause the one or more processors to:

generate a playback structure for the media stream to facilitate playback of the recorded video stream at the second frame rate, the first audio stream at the first playback speed, and the second audio stream at the second playback speed.

30. An apparatus comprising:

means for storing data corresponding to a media stream including video recorded at a first frame rate and multiple audio segments, the multiple audio segments including one or more first audio segments indicated as having a first playback type and one or more second audio segments indicated as having a second playback type;

means for recording the media stream to generate a recorded media stream, the recorded media stream comprising a recorded video stream corresponding to the video and a recorded audio stream;

means for processing the recorded audio stream using a neural network to generate multiple audio streams, the multiple audio streams including a first audio stream including audio categorized as having the first playback type and a second audio stream including audio categorized as having the second playback type; and means for initiating playback of the media stream, the playback of the media stream including:

playback of the video at a second frame rate that is different from the first frame rate;

playback of one or more first audio segments at a first playback speed corresponding to the first frame rate; and playback one or more second audio segments at a second playback speed corresponding to the second frame rate.

* * * * *